(12) United States Patent
Chung

(10) Patent No.: US 9,079,258 B2
(45) Date of Patent: Jul. 14, 2015

(54) TABLE SAW WITH BELT STOP

(75) Inventor: Brian Hyuk Joon Chung, Schaumburg, IL (US)

(73) Assignee: Robert Bosch GmbH, Stuttgart (DE)

( * ) Notice: Subject to any disclaimer, the term of this patent is extended or adjusted under 35 U.S.C. 154(b) by 1354 days.

(21) Appl. No.: 12/547,977

(22) Filed: Aug. 26, 2009

(65) Prior Publication Data

US 2011/0048190 A1    Mar. 3, 2011

(51) Int. Cl.

| | |
|---|---|
| B23D 45/06 | (2006.01) |
| B27G 19/02 | (2006.01) |
| B23D 47/00 | (2006.01) |
| B26D 7/22 | (2006.01) |
| B23Q 11/00 | (2006.01) |
| B27B 5/29 | (2006.01) |
| B23D 47/08 | (2006.01) |

(52) U.S. Cl.
CPC .............. *B23D 47/00* (2013.01); *B23D 45/062* (2013.01); *B23D 45/063* (2013.01); *B23D 45/067* (2013.01); *B23D 47/08* (2013.01); *B23Q 11/0078* (2013.01); *B26D 7/22* (2013.01); *B27B 5/29* (2013.01); *B27G 19/02* (2013.01)

(58) Field of Classification Search
CPC .............. B23D 45/061; B23D 45/065–45/067; B23D 47/00; B23D 47/08; B23D 47/10; B23D 59/002; B27B 5/243; B27B 5/38; B27G 19/02; B23Q 11/0078; B23Q 11/0082; B23Q 11/0089; B23Q 11/0092
USPC .............. 83/477.2, 58, 62, 62.1, 564, DIG. 1; 144/356, 382, 420, 427
See application file for complete search history.

(56) References Cited

U.S. PATENT DOCUMENTS

| | | |
|---|---|---|
| 2,505,958 A | 5/1950 | Grierson |
| 2,652,863 A | 9/1953 | Grabinski |
| 2,719,547 A | 10/1955 | Gjerde |
| 2,844,173 A | 7/1958 | Gaskell |
| 2,898,893 A | 8/1959 | Rohrer et al. |
| 2,903,848 A | 9/1959 | Mayhew et al. |
| 2,937,672 A | 5/1960 | Gjerde |
| 3,013,592 A | 12/1961 | Ambrosio et al. |
| 3,036,608 A | 5/1962 | Weber |
| 3,320,740 A | 5/1967 | Hamkins |
| 3,344,819 A | 10/1967 | Mitchell |
| 3,954,051 A | 5/1976 | Steiniger |
| 4,161,272 A | 7/1979 | Brockl |

(Continued)

FOREIGN PATENT DOCUMENTS

| | | |
|---|---|---|
| DE | 20007037 | 7/2000 |
| DE | 202004012468 | 11/2004 |

OTHER PUBLICATIONS

Photograph of Mafell Erika 70Ec Pull-Push saw, downloaded Oct. 29, 2009 from http://www.maschinensucher.de/ma2/bilderanzeigen-A600704-1-english.html.

*Primary Examiner* — Clark F Dexter
(74) *Attorney, Agent, or Firm* — Maginot Moore & Beck LLP

(57) ABSTRACT

A table saw in one embodiment includes a work-piece support surface, a shaping device support shaft automatically retractable along a retraction path to a location beneath the work-piece support surface in response to a sensed condition, a belt positioned across the retraction path, and a control system configured to cause the shaping device support shaft to retract along the retraction path in response to a sensed condition.

15 Claims, 17 Drawing Sheets

(56) References Cited

U.S. PATENT DOCUMENTS

| | | |
|---|---|---|
| 4,184,394 A | 1/1980 | Gjerde |
| 4,336,733 A | 6/1982 | Macksoud |
| 4,616,447 A | 10/1986 | Haas et al. |
| 4,962,685 A | 10/1990 | Hagstrom |
| 5,676,319 A | 10/1997 | Stiggins et al. |
| 5,819,625 A | 10/1998 | Sberveglieri |
| 6,036,608 A | 3/2000 | Morris |
| 6,108,916 A * | 8/2000 | Zeiler et al. ............. 30/391 |
| 6,530,303 B1 | 3/2003 | Parks et al. |
| 6,536,536 B1 | 3/2003 | Gass et al. |
| 6,813,983 B2 | 11/2004 | Gass et al. |
| 6,826,988 B2 | 12/2004 | Gass et al. |
| 6,834,730 B2 | 12/2004 | Gass et al. |
| 6,857,345 B2 | 2/2005 | Gass et al. |
| 6,877,410 B2 | 4/2005 | Gass et al. |
| 6,880,440 B2 | 4/2005 | Gass et al. |
| 6,920,814 B2 | 7/2005 | Gass et al. |
| 6,922,153 B2 | 7/2005 | Pierga et al. |
| 6,945,148 B2 | 9/2005 | Gass et al. |
| 6,945,149 B2 | 9/2005 | Gass et al. |
| 6,957,601 B2 | 10/2005 | Gass et al. |
| 6,994,004 B2 | 2/2006 | Gass et al. |
| 6,997,090 B2 | 2/2006 | Gass et al. |
| 7,000,514 B2 | 2/2006 | Gass et al. |
| 7,024,975 B2 | 4/2006 | Gass et al. |
| 7,029,384 B2 | 4/2006 | Steimel et al. |
| 7,055,417 B1 | 6/2006 | Gass |
| 7,077,039 B2 | 7/2006 | Gass et al. |
| 7,093,668 B2 | 8/2006 | Gass et al. |
| 7,098,800 B2 | 8/2006 | Gass |
| 7,100,483 B2 | 9/2006 | Gass et al. |
| 7,121,358 B2 | 10/2006 | Gass et al. |
| 7,137,326 B2 | 11/2006 | Gass et al. |
| 7,171,879 B2 | 2/2007 | Gass et al. |
| 7,191,526 B2 * | 3/2007 | Zeiler et al. ............. 30/391 |
| 7,197,969 B2 | 4/2007 | Gass et al. |
| 7,210,383 B2 | 5/2007 | Gass et al |
| 7,225,712 B2 | 6/2007 | Gass et al. |
| 7,228,772 B2 | 6/2007 | Gass |
| 7,231,856 B2 | 6/2007 | Gass et al. |
| 7,284,467 B2 | 10/2007 | Gass et al. |
| 7,290,472 B2 | 11/2007 | Gass et al. |
| 7,290,967 B2 | 11/2007 | Steimel et al. |
| 7,308,843 B2 | 12/2007 | Gass et al. |
| 7,328,752 B2 | 2/2008 | Gass et al. |
| 7,347,131 B2 | 3/2008 | Gass |
| 7,350,444 B2 | 4/2008 | Gass et al. |
| 7,350,445 B2 | 4/2008 | Gass et al. |
| 7,353,737 B2 | 4/2008 | Gass et al. |
| 7,357,056 B2 | 4/2008 | Gass et al. |
| 7,359,174 B2 | 4/2008 | Gass |
| 7,377,199 B2 | 5/2008 | Gass et al. |
| 7,421,315 B2 | 9/2008 | Gass et al. |
| 7,472,634 B2 | 1/2009 | Gass et al. |
| 7,475,542 B2 | 1/2009 | Borg et al. |
| 7,481,140 B2 | 1/2009 | Gass et al. |
| 7,509,899 B2 | 3/2009 | Gass et al. |
| 7,525,055 B2 | 4/2009 | Gass et al. |
| 7,536,238 B2 | 5/2009 | Gass |
| 7,540,334 B2 | 6/2009 | Gass et al. |
| 7,591,210 B2 | 9/2009 | Gass et al. |
| 7,600,455 B2 | 10/2009 | Gass et al. |
| 7,628,101 B1 | 12/2009 | Knapp et al. |
| 7,698,975 B2 | 4/2010 | Peot et al. |
| 7,721,633 B2 | 5/2010 | Gaw |
| 8,065,943 B2 | 11/2011 | Gass et al. |
| 2002/0020265 A1 | 2/2002 | Gass et al. |
| 2003/0089212 A1 | 5/2003 | Parks et al. |
| 2004/0035595 A1 | 2/2004 | Fisher |
| 2004/0159198 A1 | 8/2004 | Peot et al. |
| 2005/0166736 A1 | 8/2005 | Gass et al. |
| 2005/0268767 A1 | 12/2005 | Pierga et al. |
| 2006/0032355 A1 * | 2/2006 | Wang ............. 83/471.1 |
| 2007/0074612 A1 | 4/2007 | Yu |

* cited by examiner

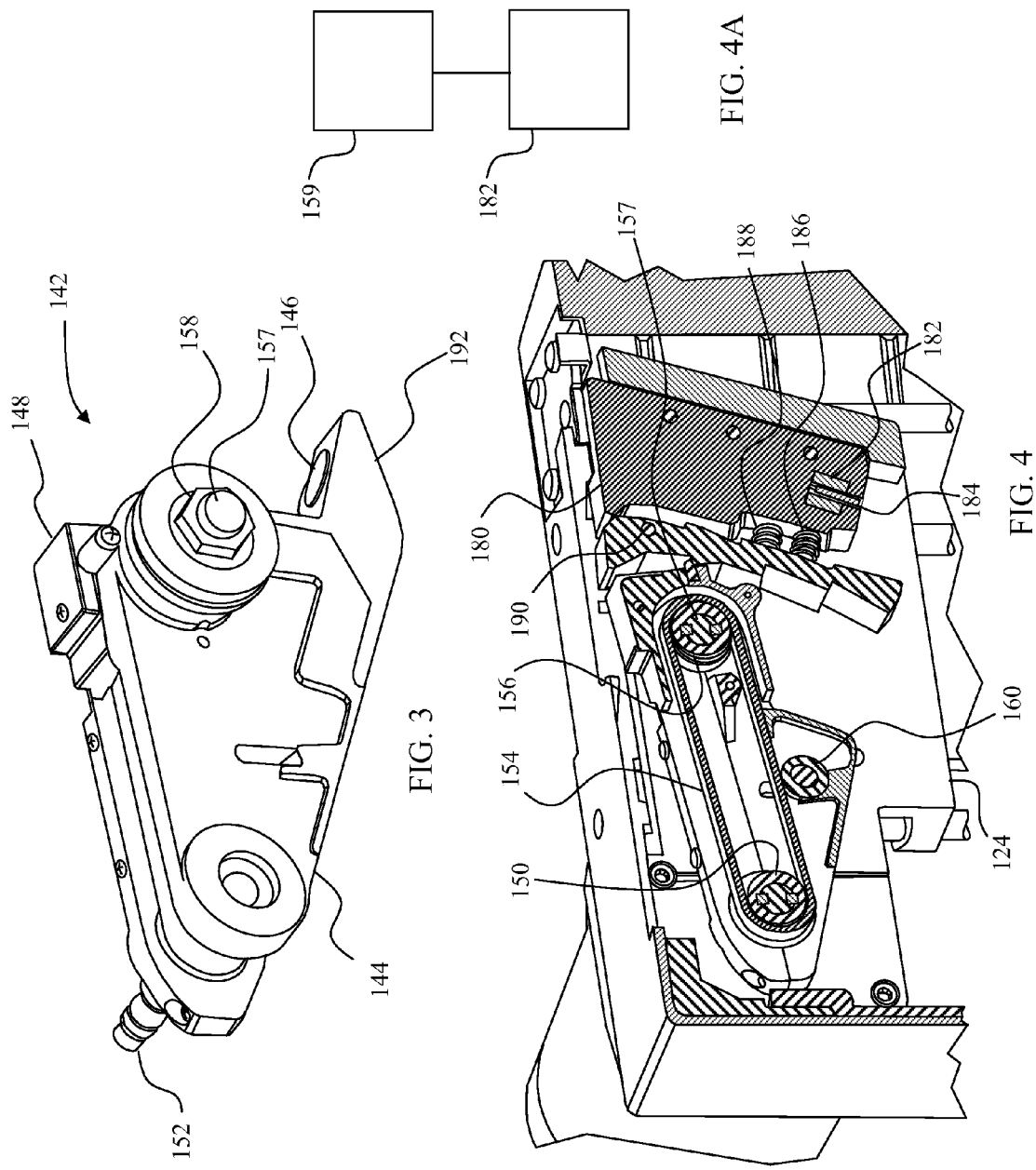

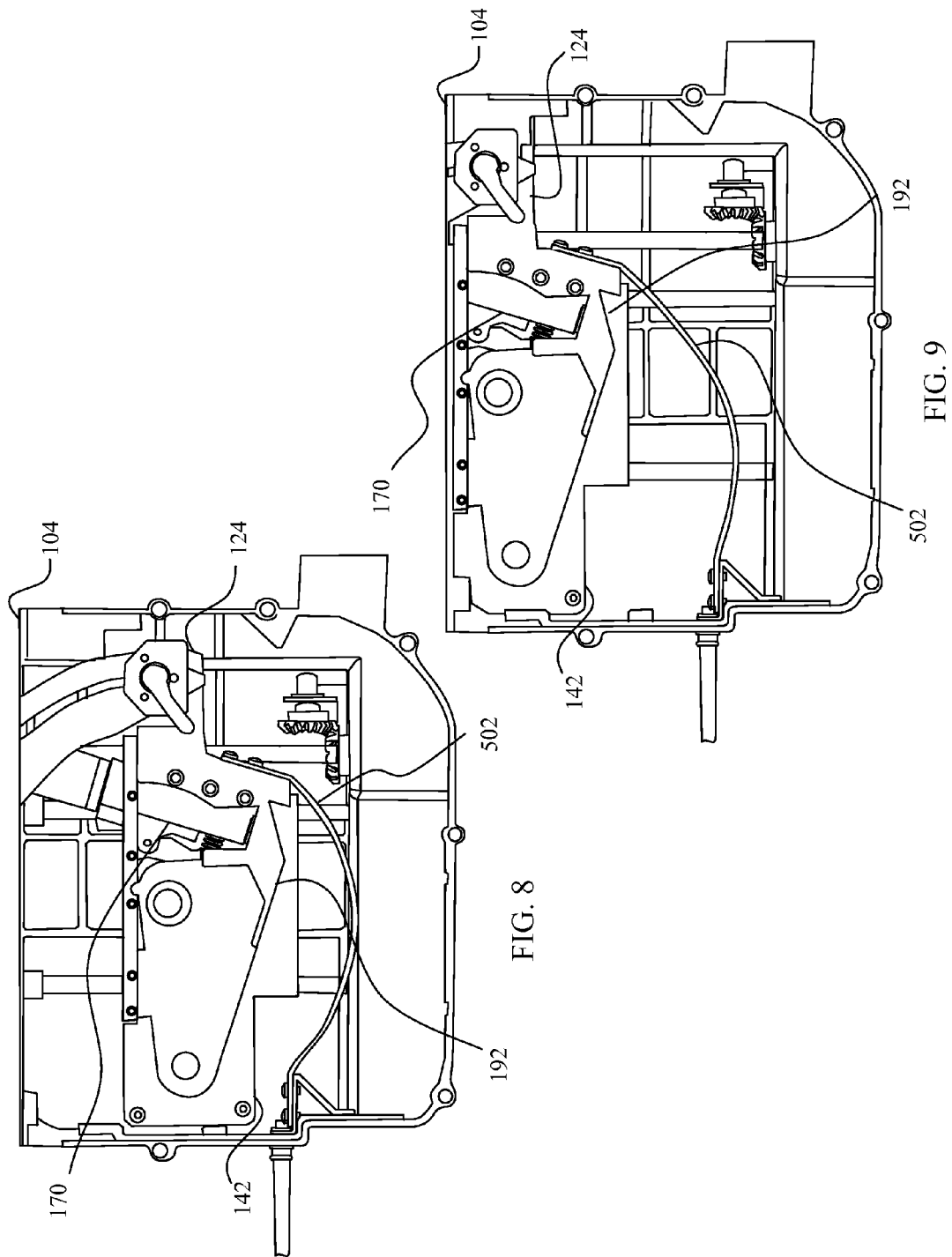

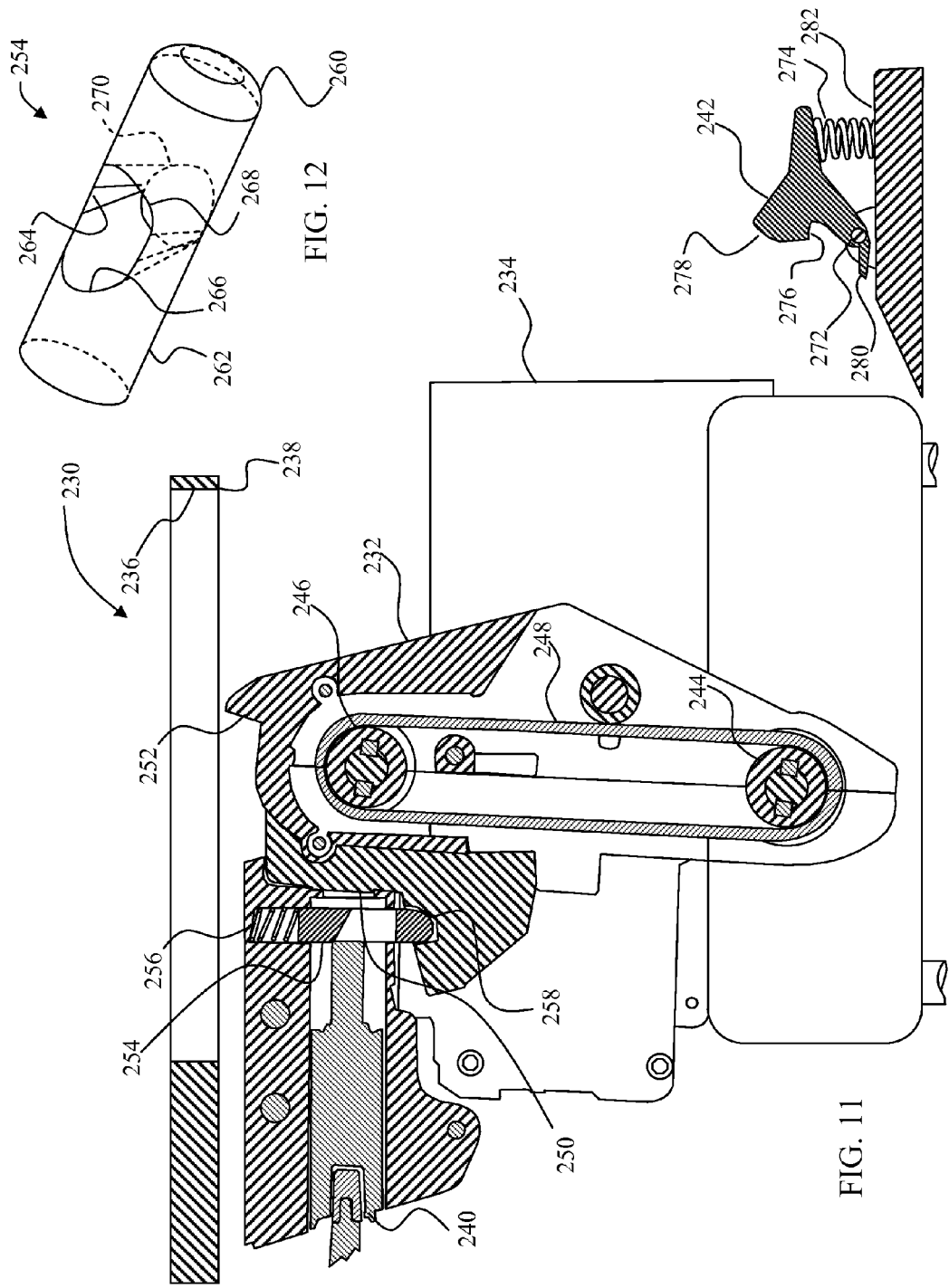

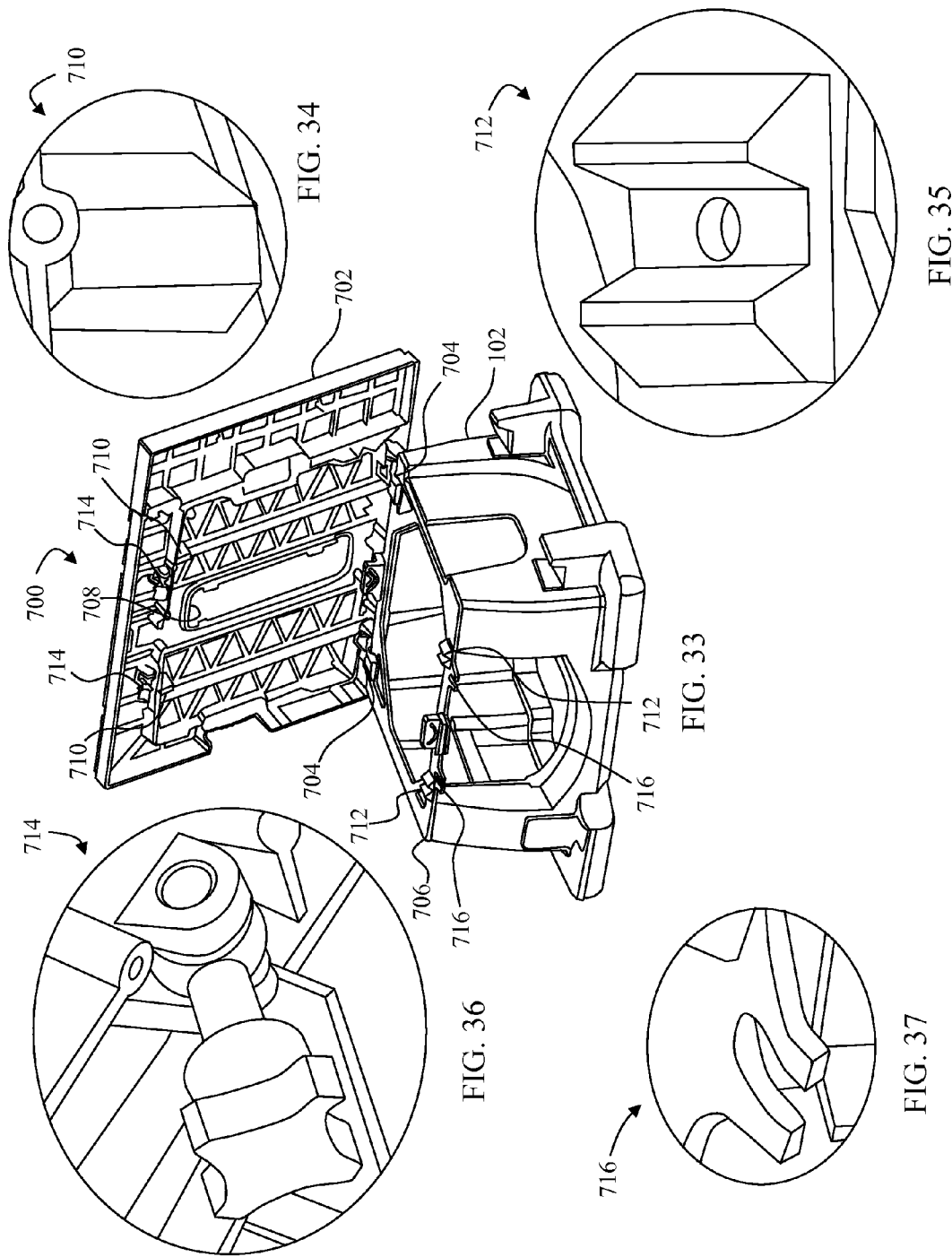

TABLE SAW WITH BELT STOP

Cross-reference is made to U.S. Utility patent application Ser. No. 12/547,818 entitled "Table Saw with Actuator Module" by Mehta et al., which was filed on Aug. 26, 2009; U.S. Utility patent application Ser. No. 12/547,859 entitled "Table Saw with Dust Shield" by Chung, which was filed on Aug. 26, 2009; U.S. Utility patent application Ser. No. 12/547,912 entitled "Table Saw with Positive Locking Mechanism" by Chung et al., which was filed on Aug. 26, 2009; U.S. Utility patent application Ser. No. 12/548,035 entitled "Table Saw with Alignment Plate" by Chung et al., which was filed on Aug. 26, 2009; U.S. Utility patent application Ser. No. 12/548,156 entitled "Table Saw with Swing Arm Support" by Chung et al., which was filed on Aug. 26, 2009; U.S. Utility patent application Ser. No. 12/548,201 entitled "Table Saw with Mechanical Fuse" by Oberheim, which was filed on Aug. 26, 2009; U.S. Utility patent application Ser. No. 12/548,236 entitled "Table Saw with Pressure Operated Actuator" by Fischer et al., which was filed on Aug. 26, 2009; U.S. Utility patent application Ser. No. 12/548,263 entitled "Table Saw with Reset Mechanism" by Groth et al., which was filed on Aug. 26, 2009; U.S. Utility patent application Ser. No. 12/548,280 entitled "Table Saw with Linkage Drop System" by Holmes et al., which was filed on Aug. 26, 2009; U.S. Utility patent application Ser. No. 12/548,317 entitled "Table Saw with Ratchet Mechanism" by Chung et al., which was filed on Aug. 26, 2009; and U.S. Utility patent application Ser. No. 12/548,342 entitled "Table Saw with Actuator Reset Mechanism" by Chung, which was filed on Aug. 26, 2009, the entirety of each of which is incorporated herein by reference. The principles of the present invention may be combined with features disclosed in those patent applications.

FIELD

The present disclosure relates to power tools and more particularly to power tools with exposed shaping devices.

BACKGROUND

A number of power tools have been produced to facilitate forming a work piece into a desired shape. One such power tool is a table saw. A wide range of table saws are available for a variety of uses. Some table saws such as cabinet table saws are very heavy and relatively immobile. Other table saws, sometimes referred to as jobsite table saws, are relatively light. Jobsite table saws are thus portable so that a worker can position the table saw at a job site. Some accuracy is typically sacrificed in making a table saw sufficiently light to be mobile. The convenience of locating a table saw at a job site, however, makes job site table saws very desirable in applications such as general construction projects.

All table saws, including cabinet table saws and job site table saws, present a safety concern because the saw blade of the table saw is typically very sharp and moving at a high rate of speed. Accordingly, severe injury such as severed digits and deep lacerations can occur almost instantaneously. A number of different safety systems have been developed for table saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, the blade guards can be removed by a user either for convenience of using the table saw or because the blade guard is not compatible for use with a particular shaping device. By way of example, a blade guard is typically not compatible with a dado blade and must typically be removed when performing non-through cuts.

Table saw safety systems have also been developed which are intended to stop the blade when a user's hand approaches or touches the blade. Various stopping devices have been developed including braking devices which are physically inserted into the teeth of the blade. Such approaches are extremely effective. Upon actuation of this type of braking device, however, the blade is typically ruined because of the braking member. Additionally, the braking member is typically destroyed. Accordingly, each time the safety device is actuated; significant resources must be expended to replace the blade and the braking member. Another shortcoming of this type of safety device is that the shaping device must be toothed. Moreover, if a spare blade and braking member are not on hand, a user must travel to a store to obtain replacements. Thus, while effective, this type of safety system can be expensive and inconvenient.

Some safety systems incorporating blade braking systems also move the blade below the surface of the table saw once the blade has been stopped. In this type of system, a latch is typically used to maintain the blade in position above the table saw surface until the braking system is activated. Once the blade has been moved to a location below the work piece support surface, movement of the blade must be stopped.

In view of the foregoing, it would be advantageous to provide a power tool with a safety system that does not damage the blade or other shaping device when stopping movement of the shaping device below the surface of a work piece support surface. A further advantage would be realized by a stopping mechanism that fits within a small space. A stopping mechanism that could be reused would be further advantageous.

SUMMARY

In accordance with one embodiment, a table saw includes a work-piece support surface, a shaping device support shaft automatically retractable along a retraction path to a location beneath the work-piece support surface in response to a sensed condition, a belt positioned across the retraction path, and a control system configured to cause the shaping device support shaft to retract along the retraction path in response to a sensed condition.

In another embodiment, a table saw includes a work piece support surface, a swing arm movable along a swing arm path from a first swing arm position whereat an arbor shaft rotatably supported by the swing arm is positioned proximate to the work piece support surface and a second swing arm position whereat the arbor shaft is distal to the work piece support surface, a stop belt positioned across the retraction path, and a control system configured to cause the swing arm to move along the swing arm path in response to a sensed condition.

BRIEF DESCRIPTION OF THE DRAWINGS

The accompanying drawings illustrate various embodiments of the present disclosure and together with a description serve to explain the principles of the disclosure.

FIG. 3 depicts a perspective view of the swing arm assembly of the table saw of FIG. 1;

FIG. 4 depicts a partial perspective cross-sectional view of the swing arm assembly of FIG. 3 supported by a latch assembly including a latch hold that is biased against the swing arm assembly;

FIG. 4A depicts a schematic view of a controller operably connected to the solenoid of FIG. 4;

FIG. 8 depicts a partial perspective view of the swing arm assembly and latch assembly of FIG. 1 as the swing arm assembly makes contact with a stop belt assembly with the carriage initial position being in a low position;

FIG. 9 depicts a partial perspective view of the swing arm assembly and latch assembly of FIG. 1 as the swing arm assembly makes contact with a stop belt assembly with the carriage initial position being in a high position;

FIG. 11 depicts a partial perspective cross-sectional view of a power tool with a vertical swing arm and a positive locking mechanism;

FIG. 12 depicts a perspective view of the positive locking mechanism of FIG. 11;

FIGS. 33, 34, 35, 36, and 37 depict a table top hood assembly and various components thereof for allowing a user unimpeded access to the internal components of the table saw.

Corresponding reference characters indicate corresponding parts throughout the several views. Like reference characters indicate like parts throughout the several views.

DETAIL DESCRIPTION OF THE DISCLOSURE

Figure 1:
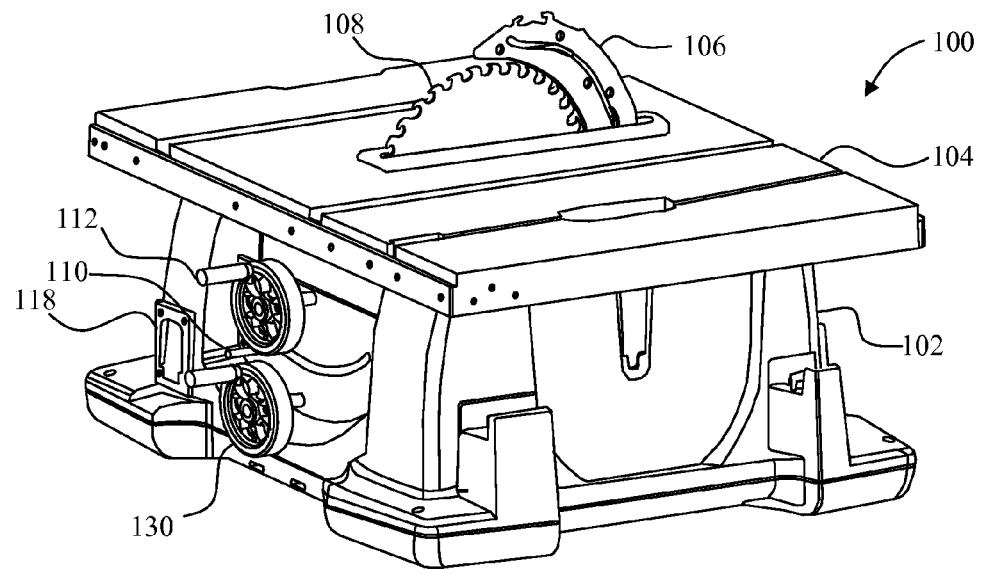
FIG. 1 depicts a top perspective view of a table saw incorporating a mitigation system in accordance with principles of the invention.

While the power tools described herein are susceptible to various modifications and alternative forms, specific embodiments thereof have been shown by way of example in the drawings and will herein be described in detail. It should be understood, however, that there is no intent to limit the power tools to the particular forms disclosed. On the contrary, the intention is to cover all combinations of features, modifications, equivalents, and alternatives falling within the spirit and scope of the invention as defined by the appended claims.

Referring to FIG. 1, a table saw 100 is shown. The table saw 100 includes a base housing 102 and a work-piece support surface 104. A splitter 106 is positioned adjacent to a blade 108 which extends from within the base housing 102 to above the work-piece support surface 104. A blade guard (not shown) may be attached to the splitter 106. An angle indicator 110 indicates the angle of the blade 108 with respect to the work-piece support surface 104. A bevel adjust turn-wheel 112 may be used to establish the angle of the blade 108 with respect to the work-piece support surface 104 by pivoting a frame 114 (shown in FIG. 2) within the base housing 102.

A motor 116 which is powered through a switch 118 located on the base housing 102, is supported by a carriage assembly 120. The carriage assembly 120 and a stop belt assembly 500 are supported by the frame 114. The carriage assembly 120 includes a carriage 124 to which the motor 116 is mounted and two guiderails 126/128. The position of the carriage 124 along the guiderails 126/128 is controlled by a blade height turn-wheel 130 through a gearing assembly 132 and a height adjustment rod 134. The carriage 124 fixedly supports a latch assembly 140 and pivotably supports a swing arm assembly 142.

The swing arm assembly 142, also shown in FIGS. 3 and 4, includes a housing 144. A strike plate 146 and a rebound plate 148 are mounted on the housing 144. The housing 144 encloses a power wheel 150 that is driven by a power shaft 152. The power shaft 152 may be directly driven by the motor 116 or by a reduction gear. A belt 154 transfers rotational movement from the power wheel 150 to a blade wheel 156 which rotates on a shaping device support shaft (also referred to as an "arbor shaft") 157. A nut 158 is used to affix the blade 108 (not shown in FIGS. 3 and 4 for purpose of clarity) to the blade wheel 156. A tensioner 160 maintains the belt 154 at a desired tension.

Figure 5:
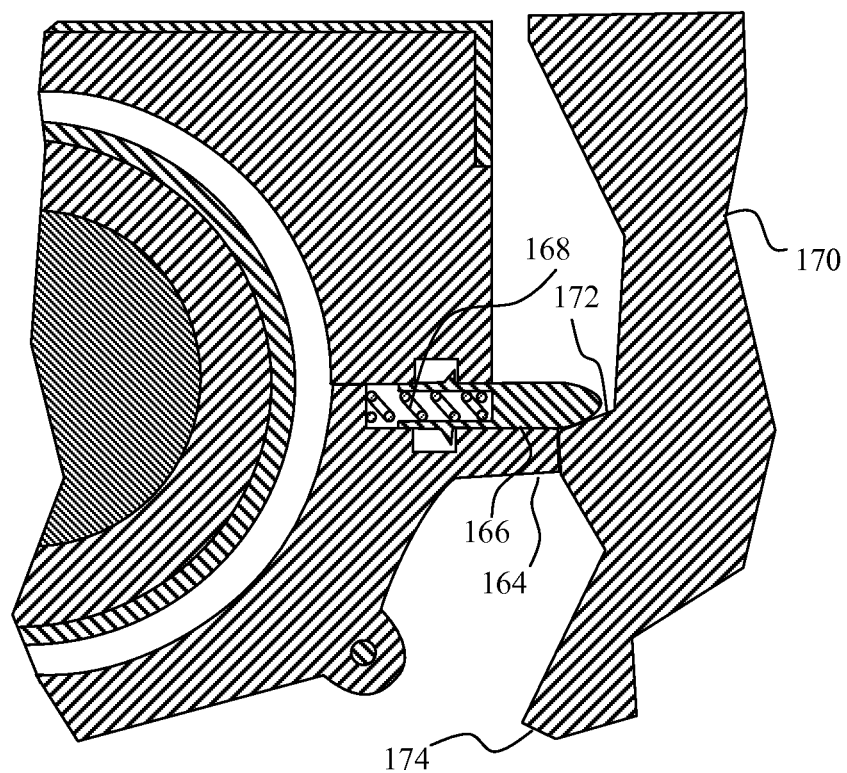
FIG. 5 depicts a partial cross-sectional view of a swing arm assembly held in position by a latch pin biased against a latch hold.

With additional reference to FIG. 5, the swing arm assembly 142 also includes a lip 164 and a latch pin 166 which is biased by a spring 168 toward a latch hold 170 which is part of the latch assembly 140. In alternate embodiments, the latch pin is fixedly attached to the swing arm assembly 142. The latch hold 170 includes a latch ledge 172 (see FIG. 5). As shown in FIG. 5, the latch ledge is formed complementarily to the shape of the latch pin 166. The latch assembly 140 further includes a base 180 and a solenoid 182 with a solenoid pin 184. Two springs 186 and 188 are positioned between the base 180 and the latch hold 170 which is mounted by a pivot 190 to the carriage 124.

Operation of the table saw 100 is described with reference to FIGS. 1-5. Initially, the swing arm assembly 142 is maintained in a latched position with the latch pin 166 resting on the latch ledge 172 as shown in FIG. 5. In this position, the springs 188 and 186 are under compression and exert a bias on the latch hold 170 about the pivot 190 in a clockwise direction as viewed in FIG. 4. The latch hold 170 is thus biased into contact with the lip 164 of the swing arm assembly 142 which restricts rotation of the latch hold 170.

Additionally, the blade wheel 156 is positioned sufficiently close to the work-piece support surface 104 that the blade 108 extends above the work-piece support surface 104 as shown in FIG. 1. A user operates the bevel adjust turn wheel 112 to pivot the frame 114 with respect to the work-piece support surface 104 to establish a desired angle between the blade 108 and the work-piece support surface 104. The user further operates the blade height adjustment turn-wheel 130 to move the carriage 124 along the guiderails 126/128 to establish a desired height of the blade 108 above the work-piece support surface 104.

Using the switch 118, power is then applied to the motor 116 causing the output shaft 152 and the power wheel 150 to rotate. Rotation of the power wheel 150 causes the belt 154 to rotate the blade wheel 156 and the blade 108 which is mounted on the blade wheel 156. A work-piece may then be shaped by moving the work-piece into contact with the blade 108.

The table saw 100 includes a sensing and control circuit 159 (not shown) which activates the solenoid 182 in response to a sensed condition. Any desired sensing and control circuit may be used for this purpose. One acceptable sensing and control circuit is described in U.S. Pat. No. 6,922,153, the entire contents of which are herein incorporated by reference. The safety detection and protection system described in the '153 patent senses an unsafe condition and provides a control signal which, in the table saw 100, is used to actuate the solenoid 182.

Upon actuation of the solenoid 182, the solenoid pin 184 is forced outwardly from the solenoid 182. When the swing arm assembly 142 is maintained in a latched position with the latch pin 166 resting on the latch ledge 172 as shown in FIG. 5, the strike plate 146 is aligned with the solenoid pin 184. Accordingly, as the solenoid pin 184 is forced out of the solenoid 182, the solenoid pin 184 impacts the strike plate 146.

The shapes of the latch pin 166 and the latch ledge 172 are selected such that the impact of the solenoid pin 184 on the strike plate 146 generates a force tending to push the latch pin 166 against the spring 168. The spring constant of the spring 168 and the operating characteristics of the solenoid 182 are selected such that when the solenoid pin 184 impacts the strike plate 146 the generated force is sufficient to compress the spring 168 and to force the latch pin 166 into a position whereat the swing arm assembly 142 is no longer maintained in position adjacent to the latch assembly 140 by the latch pin 166. In embodiments with a spring 168 biasing the latch pin 166, the springs 188 and 186 may be omitted. In embodiments with a rigid latch pin 166, the generated force causes the latch hold 170 to rotate about the pivot 190 in a counterclockwise direction thereby forcing the springs 186 and 188 into further compression. When the latch hold 170 has rotated sufficiently, the latch ledge 172 moves out from underneath the latch pin 166.

In either event, the swing arm assembly 142 is no longer supported by the latch hold 170. Consequently, the swing arm assembly 142 pivots about the power shaft 152 in the direction of the arrow 200 of FIG. 6 such that the blade wheel 156 moves away from the work-piece support surface 104 through the position shown in FIG. 6 to the position shown in FIG. 7. Accordingly, the blade 108 is pulled by the swing arm assembly 142 in a direction away from the work-piece support surface 104.

Because the latch ledge 172 is formed complementarily to the shape of the latch pin 166, the wear of the latch ledge 172 and the latch pin 166 during the de-latching described above is reduced. Accordingly, the pressure needed to effect de-latching does not change significantly over multiple actuations of the solenoid 182. As the swing arm assembly 142 moves in the direction of the arrow 200, the rebound plate 148 of the swing arm assembly 142 rotates below the bottom surface of the latch hold 170. At this point, rotation of the latch hold 170 about the pivot 190 is no longer restrained by the swing arm assembly 142.

Figure 2:
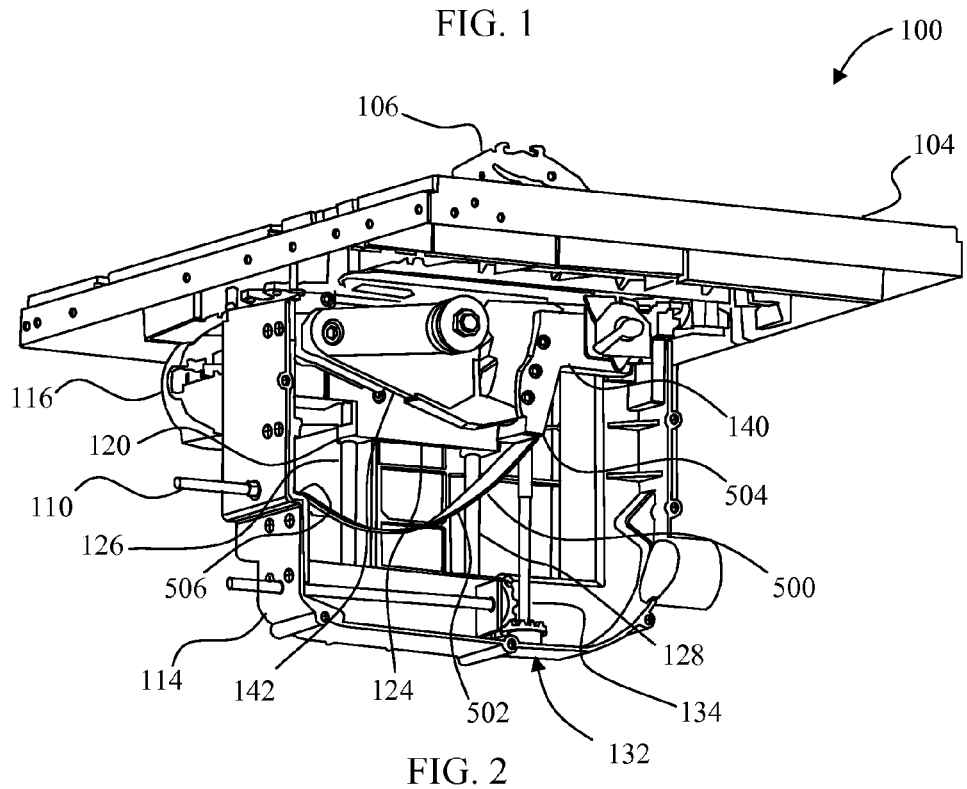
FIG. 2 depicts a bottom perspective view of the table saw of FIG. 1 with the housing removed showing a movable carriage mounted on a pivoting frame beneath the work-piece support surface.
Figure 7:
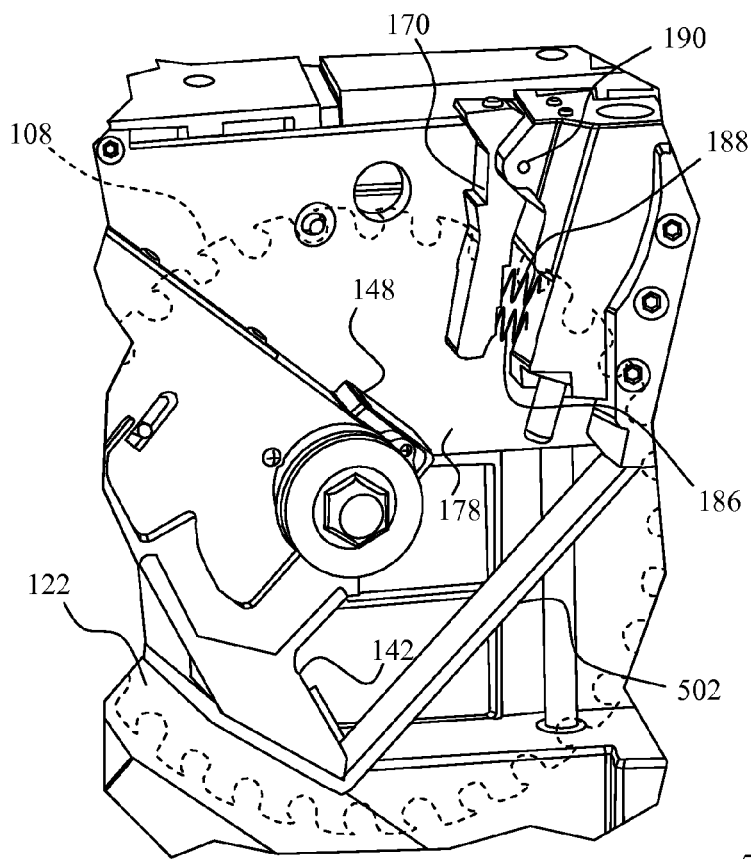
FIG. 7 depicts a partial perspective view of the swing arm assembly and latch assembly of FIG. 1 after the swing arm assembly has cleared the latch hold allowing the latch hold to be biased into the swing path.
Figure 7A:
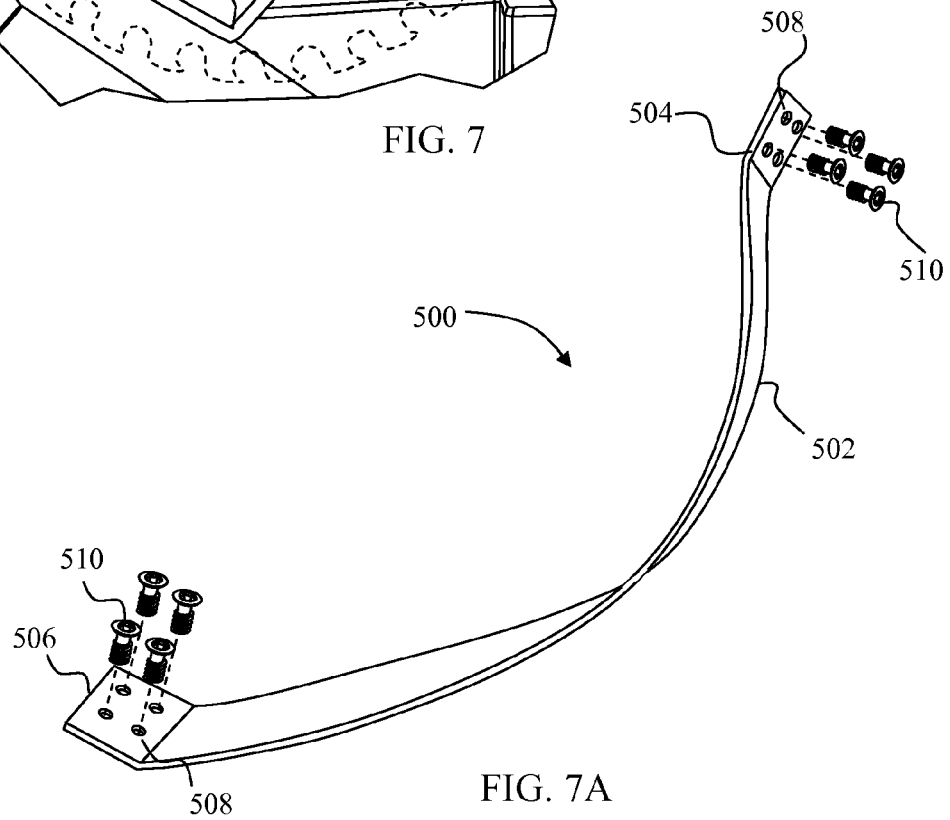
FIG. 7A depicts the stop belt assembly of FIG. 2.

The configuration of FIG. 7 further shows the swing arm assembly 142 rotated to a position whereat the swing arm assembly 142 contacts the stop belt assembly 500. The stop belt assembly 500, shown in FIG. 7A, includes a belt 502, a first anchor portion 504, a second anchor portion 506, a plurality of mounting holes 508, and a plurality of mounting screws 510. The first anchor portion 504 is mounted to the latch hold base 180. The second anchor portion 506 is mounted to the frame 114. In one embodiment the belt 502 is made from a stretchable material, e.g., NYLON. NYLON further provides friction as the swing arm assembly 142 contacts the stop belt 502. As depicted in FIG. 2, the first anchor portion 504 is closer to the work-piece support surface 104.

Figure 6:
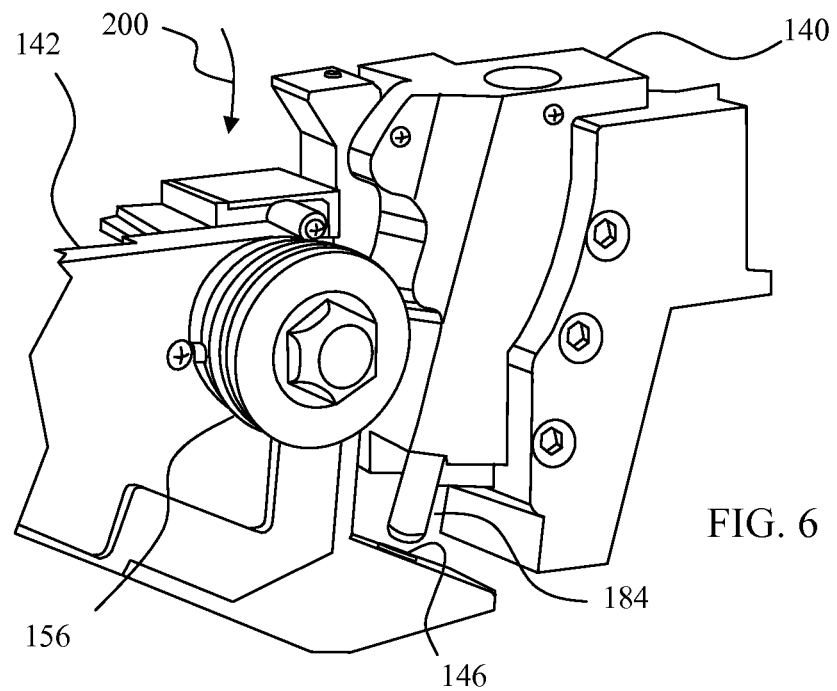
FIG. 6 depicts a partial perspective view of the swing arm assembly and latch assembly of FIG. 1 after the solenoid has been actuated thereby forcing the latch pin off of the latch hold such that the swing arm assembly moves away from the latch assembly.

In operation, the swing arm assembly 142 moves clockwise after actuation and makes contact with the belt 502. The belt 502 deforms and takes up the kinetic energy of the swing arm assembly 142. Accordingly, further rotation of the swing arm assembly 142 in the direction of the arrow 200 of FIG. 6 is impeded by the stop belt assembly 500. At this position, the blade 108 is completely located below the work-piece support surface 104. Due to the characteristic of the belt 502, kinetic energy from the swing arm assembly 142 is dissipated such that at the end of the clockwise travel the swing arm assembly 142 does not rebound significantly. Thus, the material, length and the design of the belt 502 is such that the swing arm assembly 142 stops rotation and does not rebound above the work-piece surface 104. Therefore, an operator above the work-piece support surface 104 cannot be injured by the blade 108. In some embodiments, rebound of the swing arm assembly 142 may occur. In such embodiments, the latch hold 170 may be configured with rebound ledges and the swing arm assembly 142 may be configured with a rebound plate such as those described in U.S. Utility patent application Ser. No. 12/547,818 entitled "Table Saw with Actuator Module" by Mehta et al., which was filed on Aug. 26, 2009.

The position of the stop belt assembly 500 is selected in the embodiment of FIG. 2 to ensure that the swing arm assembly 142 contacts the stop belt assembly 500 at the foot 192 of the swing arm assembly 142 regardless of the initial height of the carriage 124. Referring to FIGS. 8 and 9, the carriage 124 is depicted at different initial heights. For example, the carriage 124 in FIG. 8 has a lower initial position than the carriage 124 depicted in FIG. 9. Nonetheless, the foot 192 receives the force of the impact when the swing arm assembly 142 contacts the stop belt assembly 500 regardless of the initial height of the carriage 124. Accordingly, while the materials used to form the foot 192, and the strike plate 146 are selected to absorb multiple impacts, lighter materials may be used in other areas of the swing arm assembly 142 to minimize weight of the table saw 100.

Once the sensed condition has been cleared, the swing arm assembly 142 is reset by moving the latch hold 170 out of the swing path. This is effected by compressing the springs 188 and 186. The swing arm assembly 142 may then be rotated in a counterclockwise direction about the output shaft 152 until the rebound plate 148 is adjacent to the upper surface of the latch hold 170. The latch hold 170 is then released and the springs 188 and 186 bias the latch hold 170 about the pivot 190 into contact with the lip 164 of the swing arm assembly 142 which restricts rotation of the latch hold 170. Additionally, the swing arm assembly 142 is maintained in a latched position with the latch pin 166 resting on the latch ledge 172 as shown in FIG. 5.

The table saw 100 thus actively monitors for an unsafe condition and initiates mitigation action automatically in the event an unsafe condition is sensed. Additionally, movement and subsequent stopping of the swing arm assembly 142 is accomplished without requiring physical contact with the blade 108. Accordingly, the blade 108 is not damaged by the mitigation action.

Moreover, because the mitigation action does not require interaction with the blade 108, the mitigation system of the table saw 100 may be used with other shaping devices such as sanding wheels, blades with varying dado blades, and molding head cutters, without requiring any modification to the mitigation system. Additionally, because the moving components of the mitigation system can be mounted on the frame 114, the mitigation system can be used with any desired blade height or bevel angle.

The mitigation system discussed with respect to the table saw 100 can be implemented using very light materials, and is thus amenable to incorporation into a variety of power tools including bench top saws and portable saws. For example, the components which are subjected to increased stress within the mitigation system, such as the solenoid pin 184, the latch hold 170, the rebound plate 148, and the strike plate 146, can be made of more durable materials including metals to withstand the impacts and stresses of activating the mitigation system. Other components, including the housings, may be fabricated from more lightweight materials to minimize the weight of the power tool.

Figure 10:
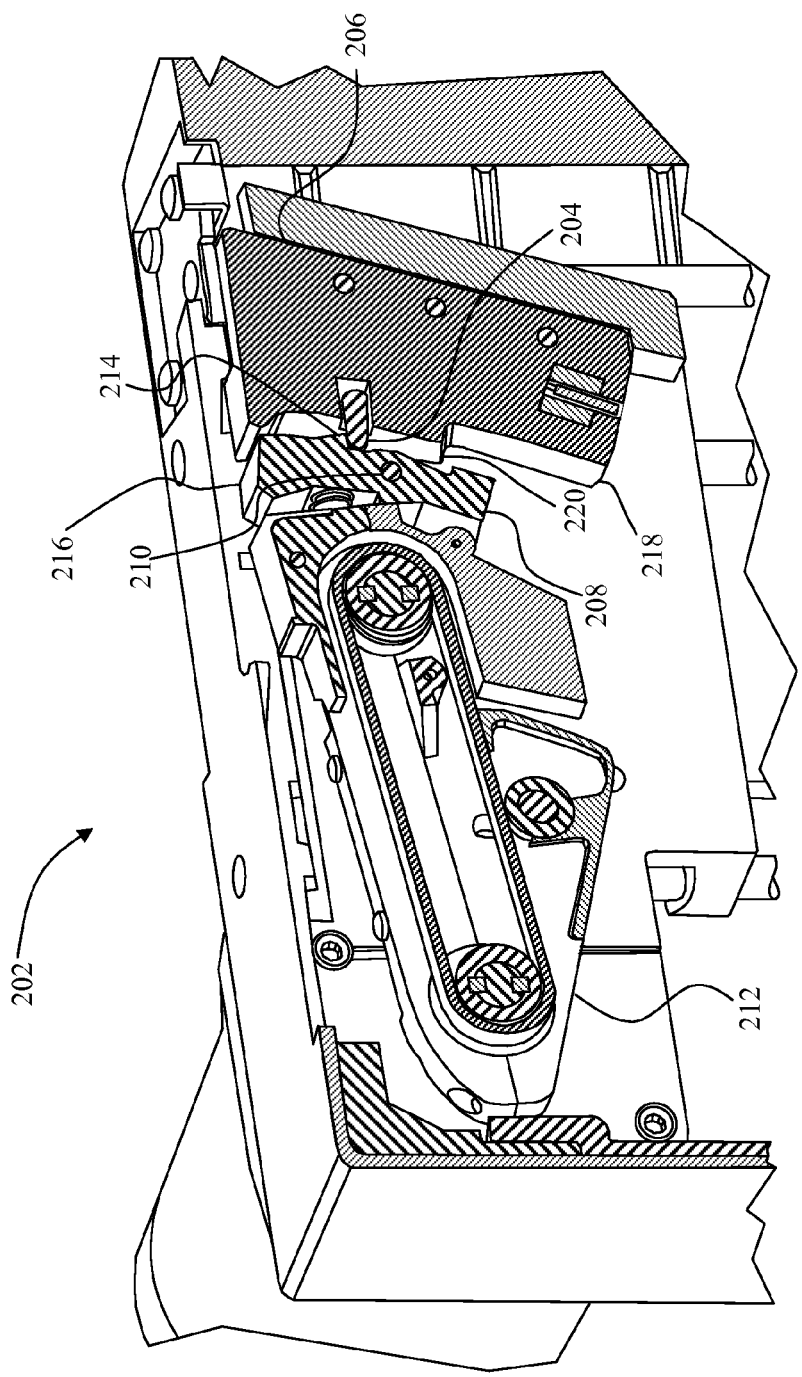
FIG. 10 depicts a partial perspective cross-sectional view of a power tool with a latching pin that does not rotate with the swing arm mechanism.

If desired, the components of the table saw 100 may repositioned within the housing 102. By way of example, FIG. 10 depicts a power tool 202 with a latch pin 204 positioned within a base 206. The latch pin 204 is biased by a spring (not shown) toward a latch hold 208 which is pivotably mounted by a pivot 210 to a swing arm assembly 212. In this embodiment, the latch hold 208 includes a latch ledge 214 and a single rebound ledge 216. The base 206 includes a rebound plate 218. An additional rebound plate 220 is provided on the base 206 as a safety measure in the event the latch hold 208 does not move with the designed speed in a manner similar to the latch hold 170. Operation of the power tool 202 as configured in the manner of FIG. 10 is substantially identical to operation of the table saw 100 as configured in FIG. 4.

A further example of rearranged components is shown in FIG. 11, wherein a power tool 230 includes a swing arm assembly 232 mounted vertically on a carriage assembly 234 below a slot 236 in a work support surface 238. The power tool 230 further includes a solenoid 240 and a rebound latch 242, both of which are also mounted to the carriage assembly 234. The swing arm assembly 232 includes a power wheel 244 which rotates a blade wheel 246 through a belt 248. The swing arm assembly 232 further includes a strike plate 250 and a latch plate 252.

The swing arm assembly 232 is maintained in the position shown in FIG. 11 by a latch pin 254. The latch pin 254 is biased by a spring 256 into a latch recess 258 in the swing arm assembly 232. The pin 254, also shown in FIG. 12, includes a head 260 and a body 262. A bore 264 extends through the body 262 and includes an actuation ramp 266. The surface of the actuation ramp 266 is angled from an upper portion 268 of the bore 264 to a lower portion 270 of the bore 264.

The rebound latch 242 is pivotably mounted to the carriage assembly 234 by a pivot 272. A spring 274 biases the rebound latch 242 in a counter clockwise direction as viewed in FIG. 11. The rebound latch 242 includes a rebound ledge 276, a release 278, and a latch foot 280. A stop pad 282 is also mounted to the carriage assembly 234.

Figure 13:
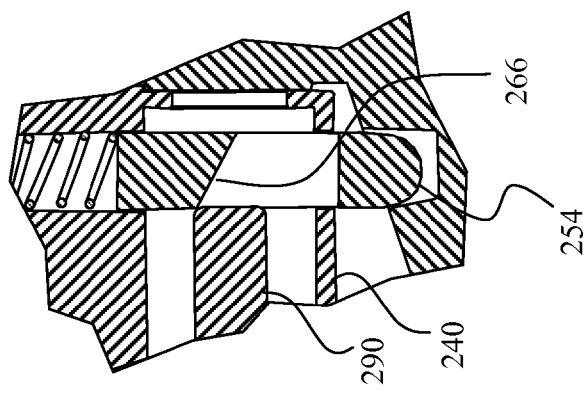
FIG. 13 depicts a partial cross-sectional view of the positive locking mechanism of FIG. 11 as a solenoid pin contacts an actuation ramp in a bore extending through the positive locking mechanism.

Operation of the power tool 230 may be substantially identical to operation of the table saw 100 through the firing of the solenoid 240. When the solenoid 240 is actuated, however, a solenoid pin 290, shown in FIG. 13, is forced outwardly from the solenoid 240 into contact with the actuation ramp 266. The shape of the solenoid pin 290 and the actuation ramp 266 forces the latch pin 254 against the spring 256. The force transferred from the solenoid 240 is sufficient to overcome the bias of the spring 256. Accordingly, the spring 256 is compressed and the pin 254 moves outwardly from the latch recess 258 to the position shown in FIG. 14.

Figure 14:
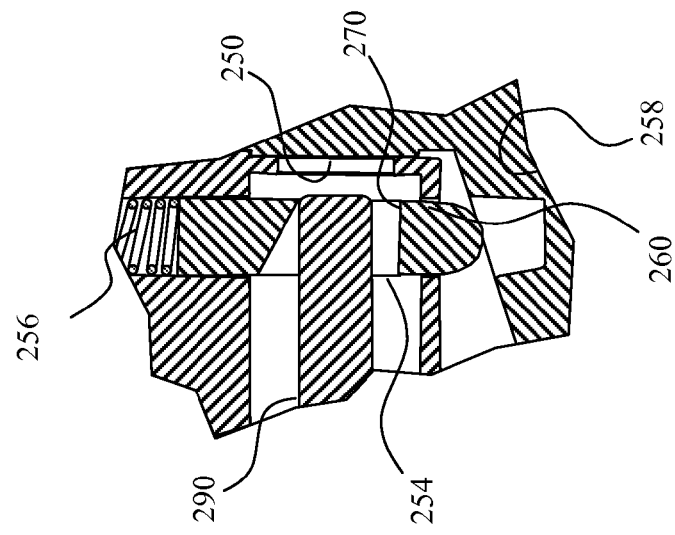
FIG. 14 depicts a partial cross-sectional view of the positive locking mechanism of FIG. 11 as a strike plate is exposed to the solenoid pin of FIG. 13 through the bore in the positive locking mechanism.

In FIG. 14, the latch pin 254 has moved to a position whereat the strike plate 250 of the swing arm assembly 232 is exposed to the solenoid pin 290 through the lower portion 270 of the bore 264. Additionally, the head 260 of the latch pin 254 has been moved to a position whereat rotation of the swing arm assembly 232 is not inhibited by the latch pin 254, even though a portion of the latch pin 254 may remain within the recess 258.

Figure 15:
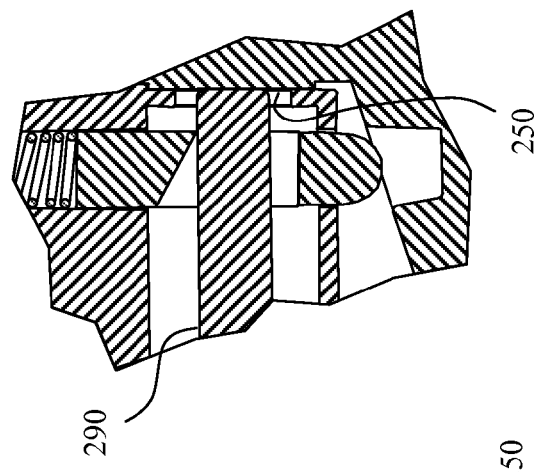
FIG. 15 depicts a partial cross-sectional view of the positive locking mechanism of FIG. 11 as the solenoid pin of FIG. 13 impacts the strike plate.
Figure 16:
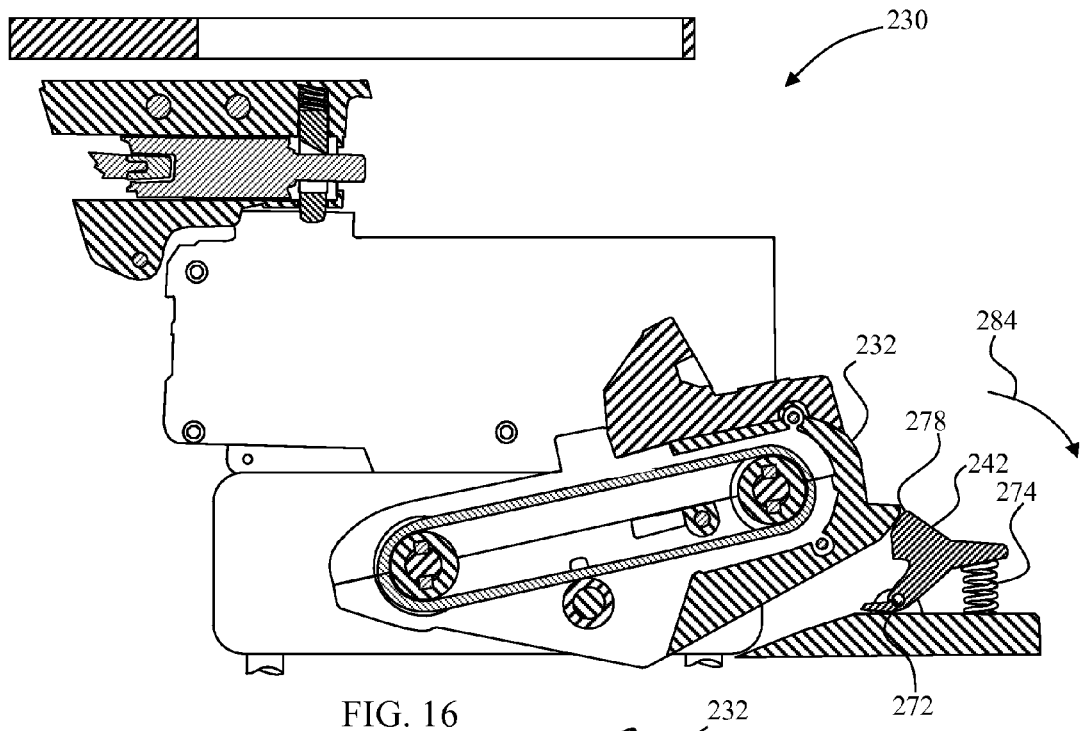
FIG. 16 depicts a partial cross-sectional view of the power tool of FIG. 11 as the swing arm assembly contacts a release on a rebound latch.

Continued movement of the solenoid pin 290 outwardly from the solenoid 240 causes the solenoid pin 290 to contact the strike plate 250 as depicted in FIG. 15. The solenoid pin 290 transfers sufficient force to the strike plate 250 to cause the swing arm assembly 232 to rotate about the power wheel 244 in a manner similar to the rotation of the swing arm assembly 142 described above. Rotation of the swing arm assembly 232 brings the swing arm assembly 232 into contact with the release 278 of the rebound latch 242 as shown in FIG. 16. The force of the swing arm assembly 232 is sufficient to overcome the bias of the spring 274 thereby rotating the rebound latch 242 about the pivot 272 in the direction of the arrow 284.

Figure 17:
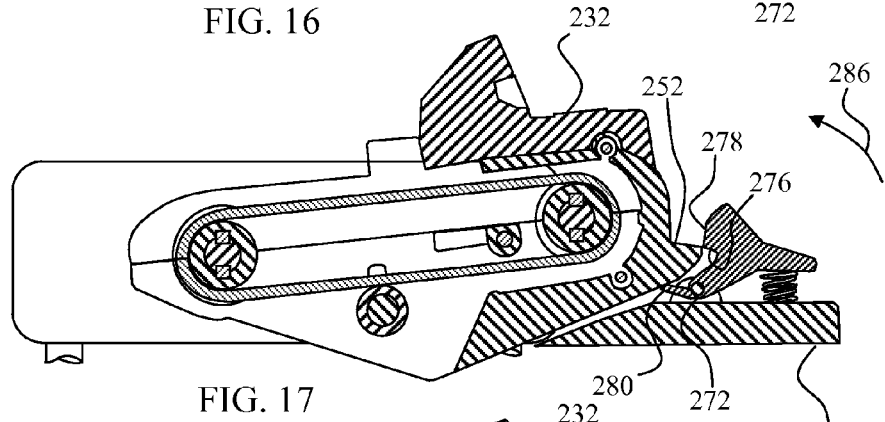
FIG. 17 depicts a partial cross-sectional view of the power tool of FIG. 11 with the swing arm assembly in contact with a latch foot on a rebound latch for automatically positioning the rebound latch to arrest rebounding of the swing arm assembly off of a stop pad.
Figure 18:
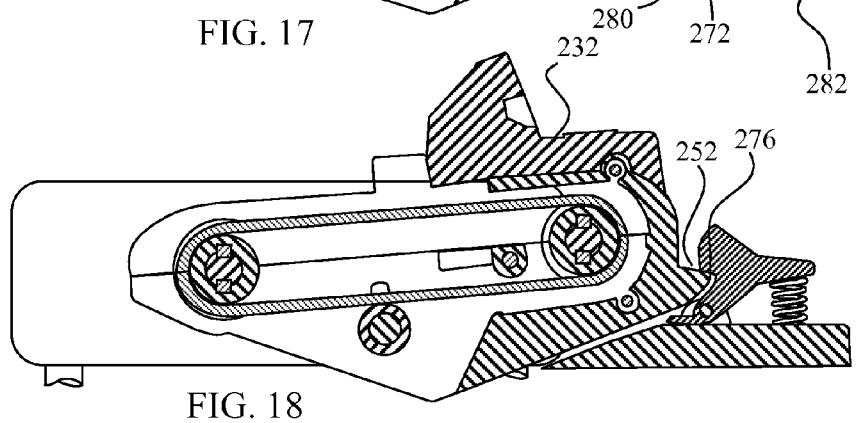
FIG. 18 depicts a partial cross-sectional view of the power tool of FIG. 11 with the swing arm assembly arrested from rebounding by the rebound latch.

Once the rebound latch 242 has rotated sufficiently, the swing arm assembly 232 slides past the release 278 and into contact with the latch foot 280 as shown in FIG. 17. Continued rotation of the swing arm assembly 232 forces the latch foot 280 downward, causing the rebound latch 242 to rotate in the direction of the arrow 286 of FIG. 17. As the rebound latch 242 rotates in the direction of the arrow 286, the rebound ledge 276 is rotated into a position above the latch plate 252 as shown in FIG. 18.

The swing arm assembly 232 then rotates into contact with the stop pad 282. In the event the swing arm assembly 232 begins to rebound off of the stop pad 282, the latch plate 252 moves into contact with the rebound ledge 276 and rotation of the swing arm assembly 232 is arrested.

Figure 19:
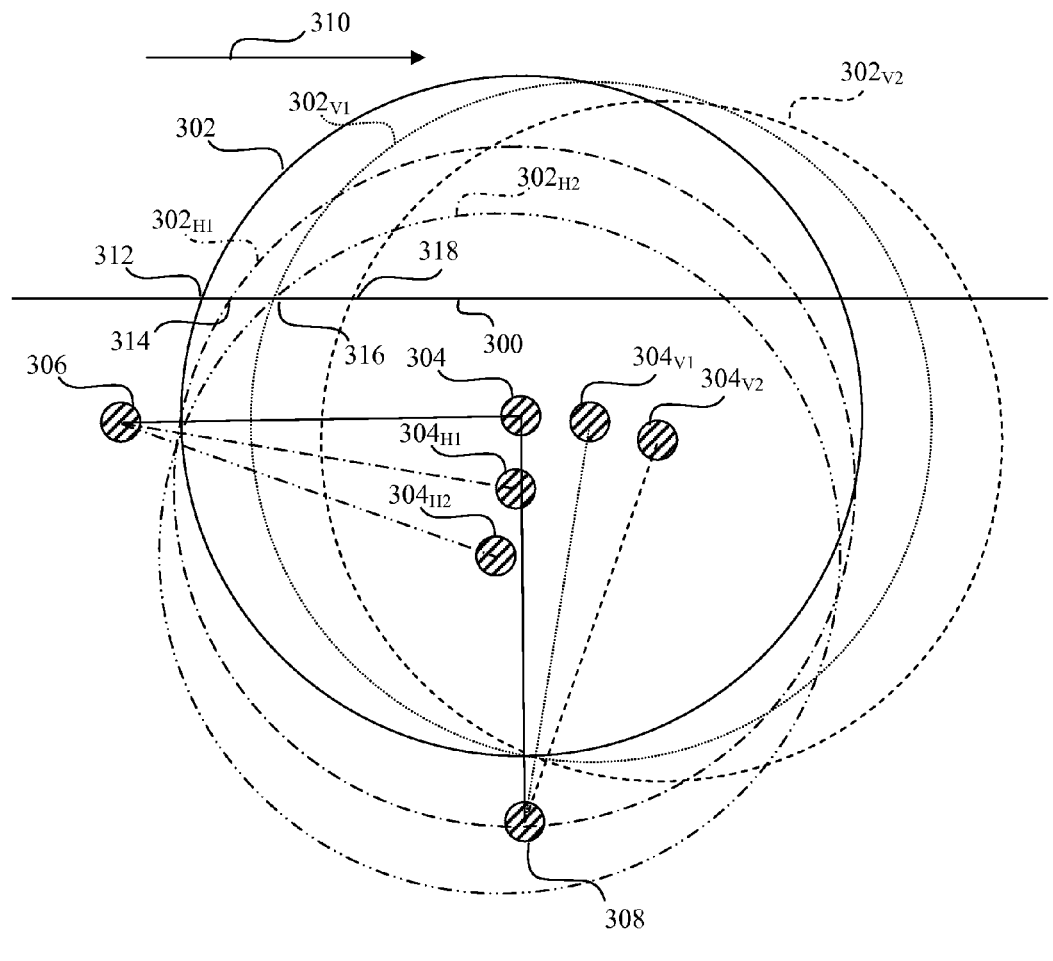
FIG. 19 depicts a schematic representation of the relative positions of a shaping tool as a horizontally mounted swing arm and a vertically mounted swing arm move a blade to a location beneath a work-piece support surface.

The vertical arm configuration of the tool 230 may be desirable in applications wherein injury is most likely to occur as a result of movement parallel to the surface of the work piece support surface. By way of example, FIG. 19 is a schematic of a work piece support surface 300 with a shaping device 302, for example, a blade 302, extending above the surface of the work piece support surface 300. The shaping device 302 rotates about an axis defined by a blade wheel 304. In a horizontal swing arm configuration, the blade wheel 304 is driven by a power shaft 306. In a vertical swing arm configuration, the blade wheel 304 is driven by a power shaft 308.

A work piece, for purpose of this example, is moved by a user toward the blade 302 in the direction of the arrow 310. Thus, the point at which the user is most likely to come into accidental contact with the shaping device 302 is at or near the location 312. When accelerated such as by a solenoid 182, the blade wheel 304, in a horizontal swing arm configuration, rotates from the position indicated by the blade wheel 304 to the position indicated by the blade wheel $304_{H1}$ in a first time interval. The location of the shaping device 302 associated with the blade wheel $304_{H1}$ is blade $302_{H1}$. Thus, the blade 302 has moved from the location 312 to the location 314.

During the same time interval, the blade wheel 304, in a vertical swing arm configuration, rotates from the position indicated by the blade wheel 304 to the position indicated by the blade wheel $304_{V1}$. The location of the shaping device 302 associated with the blade wheel $304_{V1}$ is blade $302_{V1}$. Thus, the blade 302 has moved from the location 312 to the location 316. Accordingly, the blade 302 is moved farther away from the contact point 312 by the vertical configuration than by the horizontal configuration.

Likewise, the blade wheel 304, in a horizontal swing arm configuration, rotates from the position indicated by the blade wheel $304_{H1}$ to the position indicated by the blade wheel $304_{H2}$ in a second time interval. The location of the shaping device 302 associated with the blade wheel $304_{H2}$ is blade $302_{H2}$. Thus, the blade 302 has moved from the location 312 to the location 316 over two time intervals.

During the second time interval, the blade wheel 304, in a vertical swing arm configuration, rotates from the position indicated by the blade wheel $304_{V1}$ to the position indicated by the blade wheel $304_{V2}$. The location of the shaping device 302 associated with the blade wheel $304_{V2}$ is blade $302_{V2}$. Thus, the blade 302 has moved from the location 312 to the location 318. Accordingly, the blade 302 moves away from the contact point 312 by about a factor of two in the vertical configuration as compared to the horizontal configuration.

Thus, in applications wherein an injury is most likely to occur at one side of the shaping device, a vertically oriented swing arm may be used to mitigate injury. Most table saw applications will fit into this scenario if a blade guard is installed. FIG. 19 similarly illustrates that the horizontal swing arm configuration moves the blade downwardly at a faster rate. Thus, in applications wherein the injury is most likely to occur at the top of the shaping device, a horizontal swing arm configuration may be used to mitigate injury.

As described above, operation of the latch pin 254 is significantly different from operation of the latch pin 166. Specifically, the latch pin 166 is operated by applying a force to the swing arm assembly 142. In contrast, the latch pin 254 is relatively immune to activation by application of force to the swing arm assembly 232. Accordingly, the latch pin 254 is a positive locking mechanism that is not susceptible to unintentional unlocking absent complete failure of the latch pin 254. The latch pin 254 may thus be used in swing arms that are positioned in any desired orientation.

Figure 20:
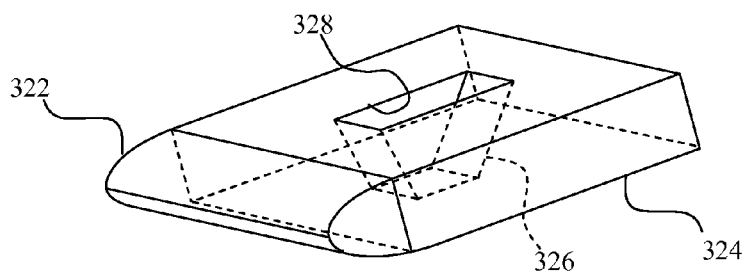
FIG. 20 depicts a perspective view of a positive locking mechanism which automatically aligns an actuating ramp with an actuator.

A variety of positive locking mechanisms, i.e., mechanisms wherein a latch is moved prior to application of rotational force to the swing arm assembly, may be incorporated into power tools. One example of another positive locking mechanism is the latch pin 320 of FIG. 20. The latch pin 320 includes a head 322 and a body 324. The latch pin 320 further includes an actuation ramp 326 within a bore 328. While the latch pin 320 is similar to the latch pin 254, the body 324 of the latch pin 320 is substantially wider than the cylindrical body 262 of the latch pin 254. Thus, the bore 328 of the latch pin 320 is easily maintained in alignment with a solenoid pin. Additionally, a non-cylindrical body such as the body 324 may provide enhanced alignment of the swing arm with which the body 324 is used.

Figure 21:
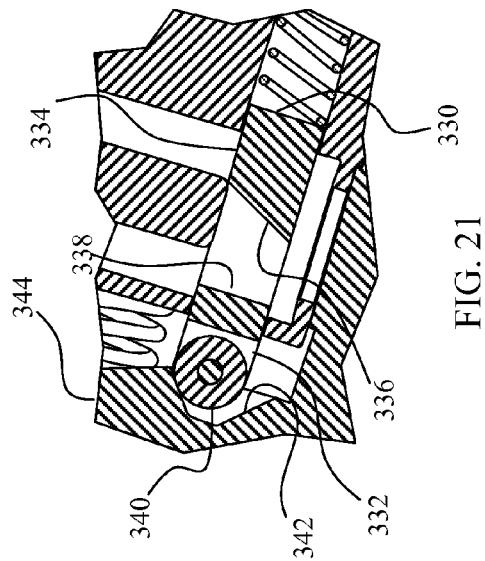
FIG. 21 depicts a cross-sectional view of a positive locking mechanism with a roller that reduces wear of the mechanism and which can be used to reduce movement of a latched swing arm assembly.

Another positive locking mechanism is the latch pin 330 of FIG. 21. The latch pin 330 includes a head 332 and a body 334. The body 334 may be any desired shape including rectangular or cylindrical. The latch pin 330 further includes an actuation ramp 336 within a bore 338. The latch pin 330 also includes a wheel 340 rotatably mounted in the head 332. The wheel 340 reduces wear on the latch pin 330. Additionally, the wheel 340 in this embodiment is configured to contact only one side of a recess 342 in a swing arm 344. Accordingly, by providing another member which limits the upward or counter-clockwise travel of the swing arm 344, the wheel 340 is used to "pinch" the swing arm 344 to reduce or eliminate undesired movement of the swing arm 344.

Figure 22:
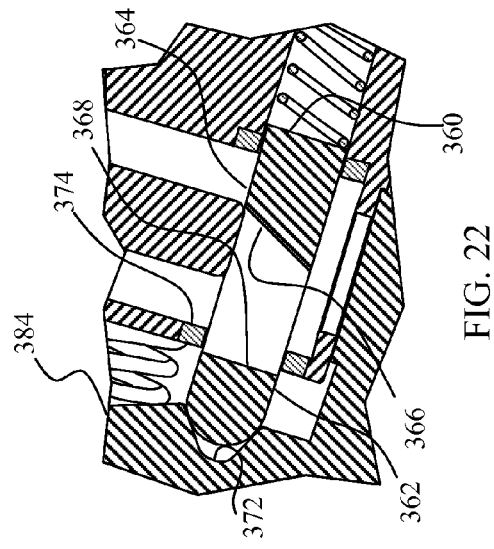
FIG. 22 depicts a cross-sectional view of a positive locking mechanism which can be used to reduce movement of a latched swing arm assembly.

Another positive locking mechanism is the latch pin 360 of FIG. 22. The latch pin 360 includes a head 362 and a body 364. The body 364 may be any desired shape including rectangular or cylindrical. The latch pin 360 further includes an actuation ramp 366 within a bore 368. The head 362 in this embodiment is configured to contact opposing tapered sides of a recess 372 in a swing arm 384. Accordingly, seating of the head 362 in the recess 372 eliminates undesired movement of the swing arm 384. Further reduction in non-axial movement of the latch pin 360 while permitting axial movement for locking and unlocking the swing arm 384 is provided by oil impregnated bushings 374.

Figure 24:
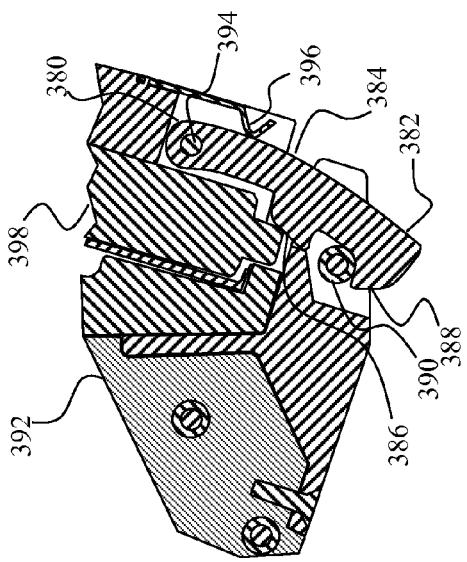
FIGS. 23 and 24 depict a positive locking mechanism which engages a pin in a swing arm assembly and with an actuation ramp extending from the body of the mechanism, and which rotates about an axis of rotation that is not parallel to the axis along which a solenoid pin moves.
Figure 23:
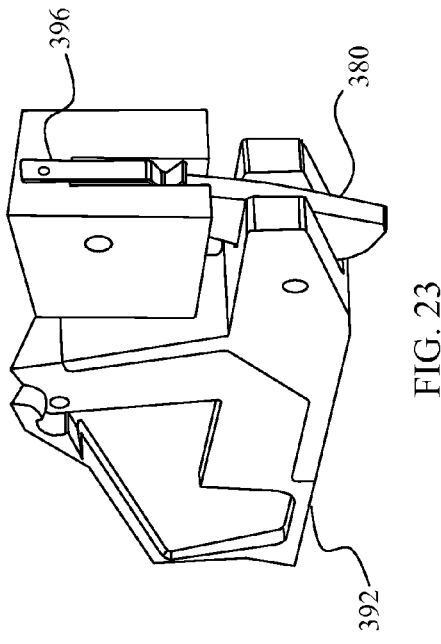

A positive locking mechanism may also be provided in the form of a rotating latch pin such as the latch pin 380 depicted in FIGS. 23 and 24. The latch pin 380 includes a head 382 and a body 384. The latch pin 380 further includes an actuation ramp 386 extending from the body 384. The head 382 includes a hook portion 388 which engages a retaining pin 390 in a swing arm 392. The latch pin 380 is pivotably supported by a pivot pin 394 and biased toward the retaining pin 390 by a spring 396. When the hook portion 388 engages the retaining pin 390, the actuation ramp 386 is aligned with a solenoid pin 398.

In operation, movement of the solenoid pin 398 causes the solenoid pin 398 to impinge the actuation ramp 386 of the latch pin 380 imparting a rotational force to the latch pin 380. The actuation ramp 386 thus converts axial force from the solenoid pin 398 to a rotational force. The rotational force overcomes the bias of the spring 396 causing the latch pin 380 to rotate in a counterclockwise direction about the pivot pin 394. The shape of the hook portion 388 and the retaining pin 390 along with the location of the hook portion 388 relative to the pivot pin 394 is selected to ensure that an upward force is not imparted onto the retaining pin 390 from the latch pin 380 during this rotation. Once the actuation ramp 386 has rotated sufficiently, the solenoid pin 398 continues to move axially into contact with the swing arm 392.

Figure 25:
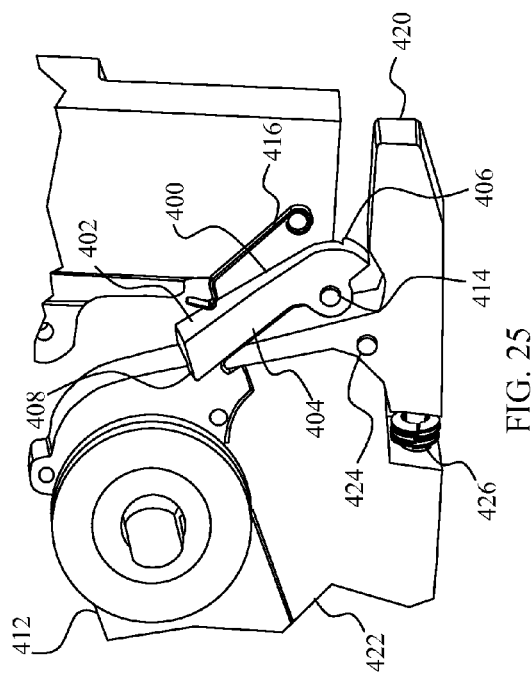
FIGS. 25 and 26 depict a positive locking mechanism which engages a recess in a swing arm assembly and with an actuation ramp defined in the body of the mechanism, and which rotates about an axis of rotation that is not parallel to the axis along which a solenoid pin moves.
Figure 26:
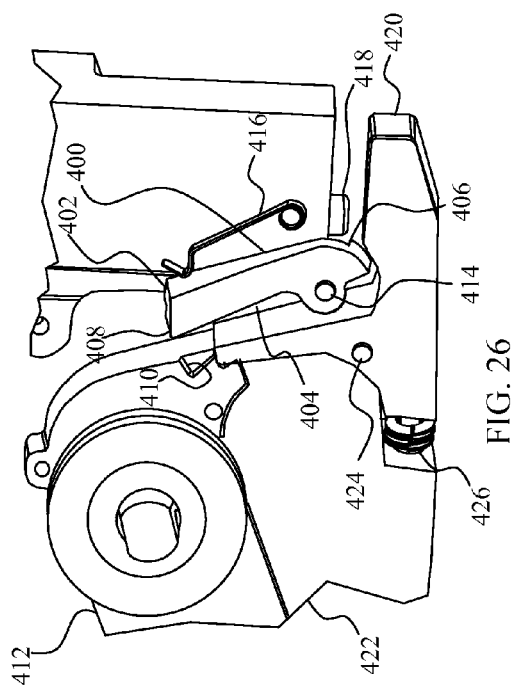

The latch pin 400 depicted in FIGS. 25 and 26 is another positive locking mechanism in the form of rotating latch pin. The latch pin 400 includes a head 402 and a body 404. The latch pin 400 further includes an actuation ramp 406 extending from the body 404. The head 402 includes a lip portion 408 which engages a retaining recess 410 in a swing arm 412. The latch pin 400 is pivotably supported by a pivot pin 414 and biased toward the retaining recess 410 by a spring 416. When the lip portion 408 engages the retaining recess 410, the actuation ramp 416 is aligned with a solenoid pin 418.

In operation, movement of the solenoid pin 418 causes the solenoid pin 418 to impinge the actuation ramp 406 of the latch pin 400 imparting a rotational force to the latch pin 400. The rotational force overcomes the bias of the spring 416 causing the latch pin 400 to rotate in a clockwise direction about the pivot pin 414. The shape of the lip portion 408 and the retaining recess 410 along with the location of the lip portion 408 relative to the pivot pin 414 is selected to ensure that an upward force is not imparted onto the retaining recess 410 from the latch pin 404 during this rotation. Once the actuation ramp 406 has rotated sufficiently, the solenoid pin 418 continues to move axially into contact with the swing arm 412.

The solenoid pin 418 in this embodiment impinges a strike plate portion 420 which is pivotably attached to a lower swing arm housing 422 by a pivot pin 424. Spring washers 426 positioned between the strike plate portion 420 and the lower swing arm housing 422 bias the strike plate portion 420 into a position aligned with the solenoid pin 418 when the lip portion 408 is within the retaining recess 410. When the solenoid pin 418 impacts the strike plate portion 420, the spring washers 426 are compressed thereby reducing the peak force that is transferred from the strike plate portion 420 to the other components of the swing arm 412. This allows lighter materials to be used for some components of the swing arm 412 while ensuring a rapid acceleration of the swing arm 412.

Figure 27:
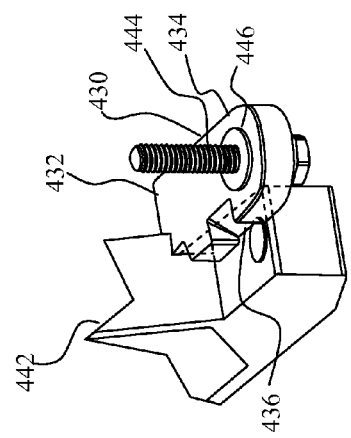
FIGS. 27 and 28 depict a positive locking mechanism which engages a recess in a swing arm assembly and with an actuation ramp defined in the body of the mechanism, and which rotates about an axis of rotation that is parallel to the axis along which a solenoid pin moves.
Figure 28:
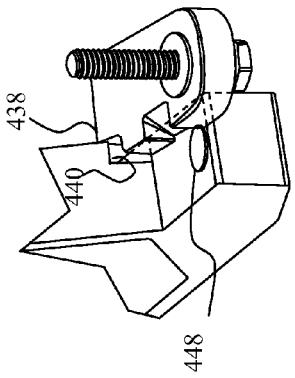

The latch pin 430 depicted in FIGS. 27 and 28 is another positive locking mechanism in the form of rotating latch pin. The latch pin 430 includes a head 432 and a body 434. The latch pin 430 further includes an actuation ramp 436 extending into the body 434. The head 432 includes a lip portion 438 which engages a retaining recess 440 in a swing arm 442. The latch pin 430 is pivotably supported by a pivot pin 444 and biased toward the retaining recess 440 by a radial spring 446. When the lip portion 438 engages the retaining recess 440, the actuation ramp 436 is aligned with a solenoid pin (not shown). If desired, a second latch pin (not shown), substantially identical to the latch pin 430, may be provided in opposition to the latch pin 430.

In operation, movement of the solenoid pin (not shown) causes the solenoid pin (not shown) to impinge the actuation ramp 436 of the latch pin 430 and the axial force is translated into a rotational force by the actuating ramp 436 imparting a rotational force to the latch pin 430. The rotational force overcomes the bias of the spring 446 causing the latch pin 430 to rotate in a clockwise direction about the pivot pin 444 and outwardly from the swing arm 442. Once the actuation ramp 436 has rotated sufficiently, the solenoid pin (not shown) continues to move axially into contact with a strike plate 448 on the swing arm 442.

Figure 29:
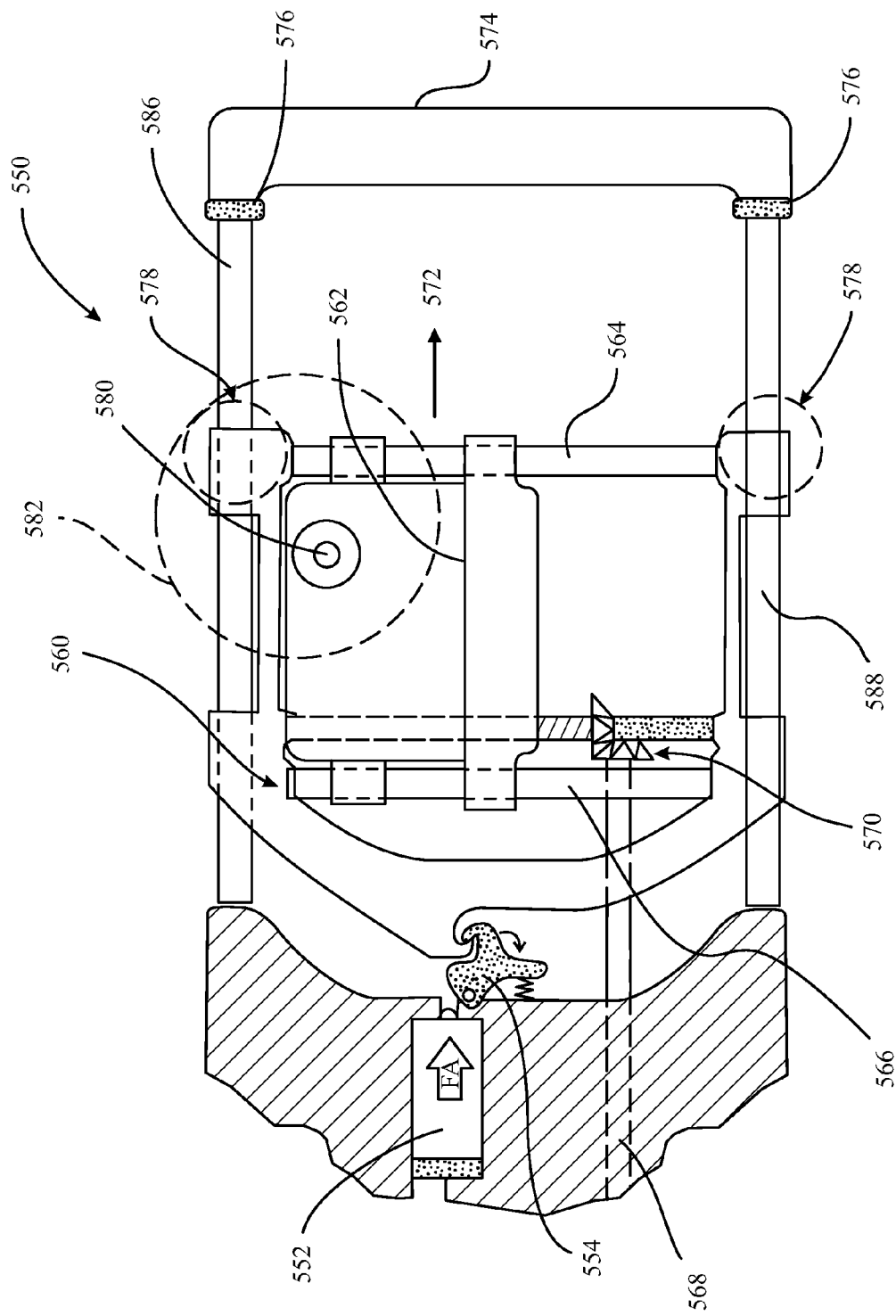
FIGS. 29, 30, 31, and 32 depict alternative embodiments to the swing arm assembly including a horizontal linear blade slide assembly, a diagonal linear blade slide assembly, and a vertical linear blade slide assembly.
Figure 30:
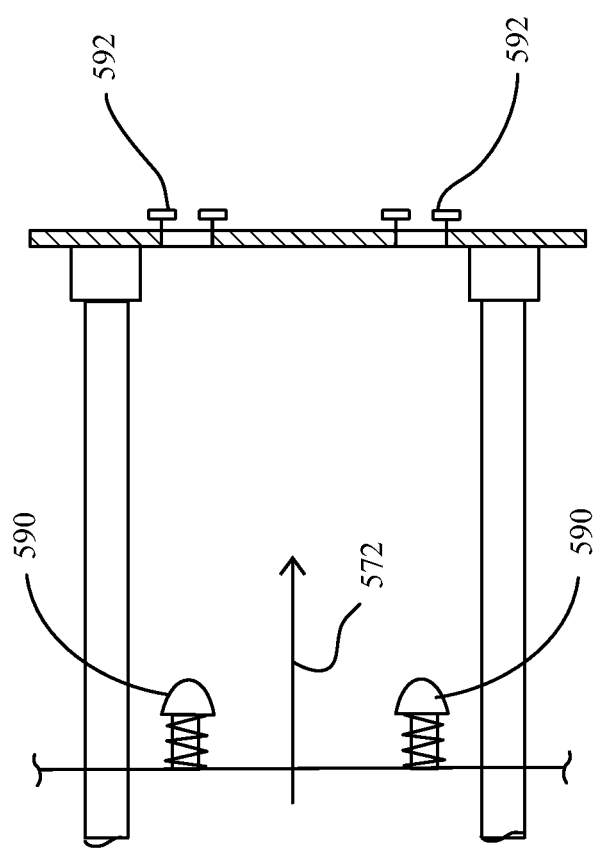

With reference to FIG. 29, a horizontal linear blade slide assembly 550 includes an actuator 552, a release hook 554, a sliding blade assembly 560, a carriage 562, height adjustment guide rails 564/566, a height adjust bar 568, a height adjust worm gear set 570, an end bar 574, stop catch pads 576, catch mechanisms 578, an arbor shaft 580, a blade 582, work-piece support surface 584, and slide blade assembly guide rails 586/588. In one embodiment, shown in FIG. 30, the catch mechanism 578 includes bonnet latches 590 while the stop catch pads 576 include bonnet catches 592.

In operation, the sliding blade assembly 560 is configured to move horizontally in the direction of an arrow denoted by the reference numeral 572 in order to move the blade away from a horizontally moving object that is not to be harmed by the blade 582. In response to a sensed event, the actuator 552 releases the release hook 554 and displaces the sliding blade assembly 560 in the direction of the arrow 572. The sliding blade assembly 560 glides on slide blade assembly guide rails 586/588 until the catch mechanisms 578 come in contact with the stop catch pads 576 which are supported by the end bar 574. The stop catch pads 576 and the catch mechanisms 578 prevent the sliding blade assembly 560 from rebounding off of the stop catch pads 576 to ensure the blade 580 does not return to a position that could harm the object. In one embodiment, the bonnet latches 590 engage bonnet catches 592 to prevent rebounding of the sliding blade assembly 560. The horizontal movement of the sliding blade assembly 560 does not interfere with the height adjustment mechanism including the height adjust bar 568, the height adjust worm gear set 570, and the height adjustment guide rails 564/566.

Figure 31:
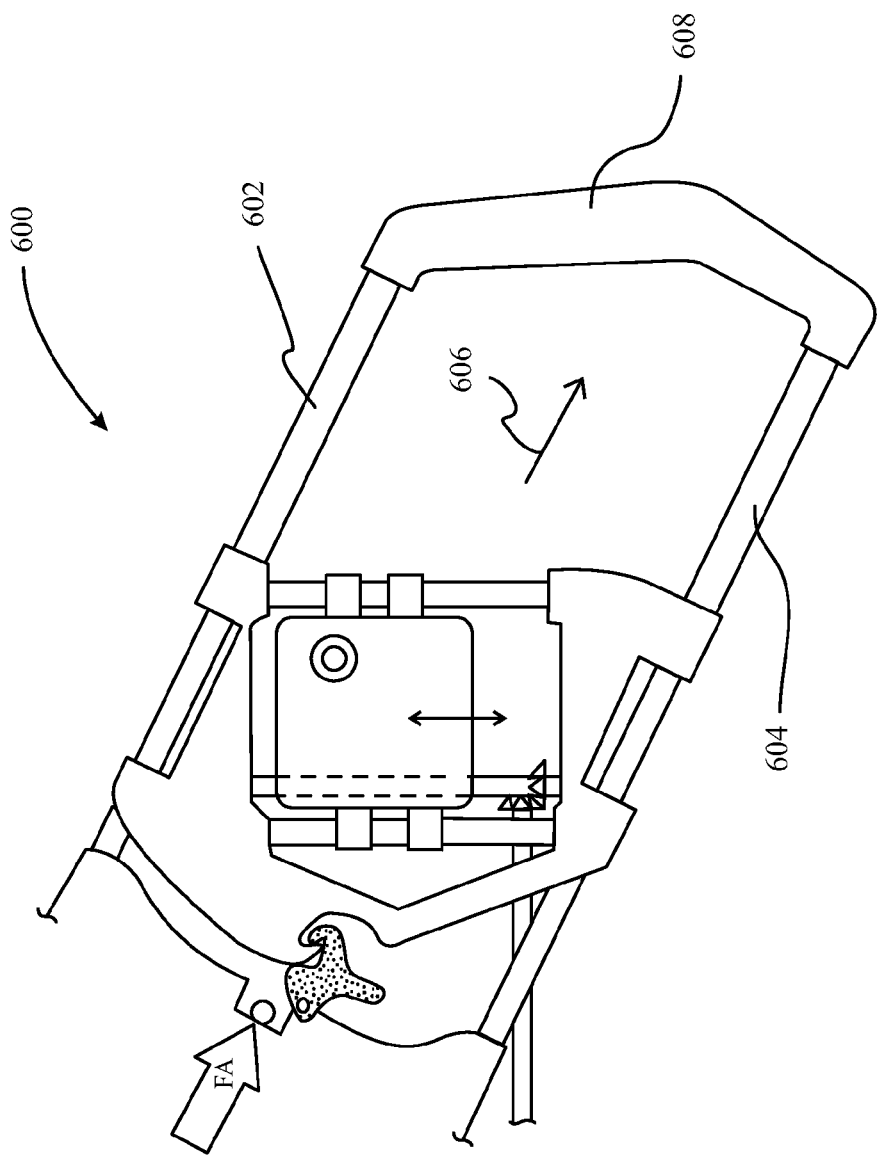

In an alternative embodiment, a diagonal linear blade slide assembly 600 is depicted in FIG. 31. The diagonal linear blade slide assembly 600 includes similar features as the horizontal linear blade slide assembly 550, with the major difference being that the slide blade assembly guide rails 586/588 are replaced with slide blade assembly guide rails 602/604 which are configured to slide the diagonal linear blade slide assembly 600 in a diagonal direction as denoted by an arrow 606 indicating the sliding direction. The end bar 608 is similarly configured to receive the diagonal linear blade slide assembly 600. In one embodiment, similar bonnet latch and catch pairs (not shown), discussed above, are included to prevent rebounding of the diagonal linear blade slide assembly 600.

Figure 32:
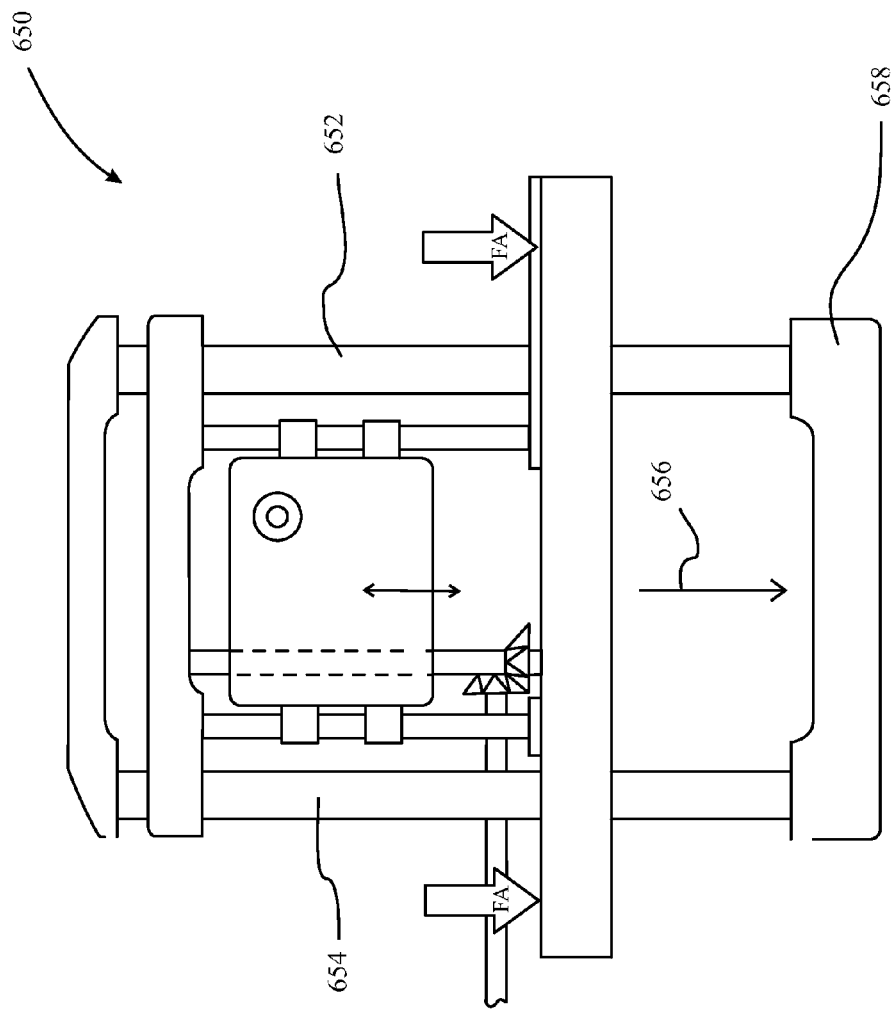

In another alternative embodiment, a vertical linear blade slide assembly 650 is depicted in FIG. 32. The vertical linear blade slide assembly 650 includes similar features as the horizontal linear blade slide assembly 550, with the major difference being that the slide blade assembly guide rails 586/588 are replaced with slide blade assembly guide rails 652/654 which are configured to slide the vertical linear blade slide assembly 650 in a vertical direction as denoted by an arrow 656 indicating the sliding direction. The end bar 658 is similarly configured to receive the vertical linear blade slide assembly 650. In one embodiment, similar bonnet latch and catch pairs (not shown), discussed above, are included to prevent rebounding of the vertical linear blade slide assembly 600.

Access to various safety system components may be provided by a table top hood assembly 700 of FIG. 33. The table top hood assembly 700 can also be used to gain unimpeded access to a variety of equipment, e.g., to replace the blade 108, under the work-piece support surface 104. The table top hood assembly 700 includes a hood 702, which is connected to the housing 102 by hinges 704. A reinforcement member 706 provides additional strength at the upper portion of the housing 102 to support the hood assembly 700. An opening 708 is configured to permit the blade 108 to turn and be adjusted for height and bevel without interference with the hood 702.

Alignment members 710, shown in FIG. 34, are positioned on the inner surface of the hood 702. The alignment members, which are generally wedge shaped, cooperate with alignment members 712 on the housing 102 (shown in FIG. 35) to align the hood 702 with the housing 102. Lock-downs 714 shown in FIG. 36 are pivotably connected to the underside of the hood 702 for use with locking members 716 shown in FIG. 37 in securing the hood 702 in a locked position aligned on top of the housing 102.

The hinges 704 may be spring loaded hinges to assist in raising the hood 702 and a lock bar (not shown) may be used to maintain the hood 702 in an open position. In alternative embodiments, the carriage assembly 120 is directly mounted to the hood 702. In such embodiments, the spring loaded hinges 704 may be aumented with one or more pneumatic cylinders. In one embodiment, two pneumatic cylinders may be provided to prevent undue stress being applied to the hinges 704. Two or more pneumatic cylinders are particularly useful in embodiments wherein the carriage assembly is attached to the hood 702.

If desired, electrical cut-off switches (not shown) may be positioned on the housing 102 so as to mate with electrical cut-off contacts (not shown) mounted on the hood 702 to ensure the table saw 100 is not energized when the hood 702 is raised.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A table saw comprising:
a work piece support surface;
a swing arm assembly including a shaping device support shaft, the swing arm assembly automatically retractable along a retraction path from a proximate position whereat the support shaft is proximate to the work piece support surface to a distal position whereat the support shaft is distal to the work piece support surface;
a stop belt positioned across the retraction path; and
a control system configured to cause the swing arm assembly to retract along the retraction path in response to a sensed condition.

2. The table saw of claim 1, wherein the stop belt comprises a stretchable material.

3. The table saw of claim 2, wherein the stretchable material comprises a NYLON material.

4. The table saw of claim 1, wherein the retraction path is substantially linear.

5. The table saw of claim 1, wherein the retraction path is curved.

6. The table saw of claim 5, further comprising:
a latch hold mechanism;
a swing arm movable along the retraction path, the shaping device support shaft rotatably supported by the swing arm;
a latch pin movable between a first latch pin position whereat the swing arm is maintained at a first swing arm position and a second latch pin position whereat the swing arm is not maintained at the first swing arm position; and
an actuating device configured to transfer a first force to the latch pin to bias the latch pin in a direction toward the second latch pin position, and, after transferring the first force, further configured to transfer a second force to the swing arm.

7. The table saw of claim 6, further comprising:
a frame supporting the swing arm, wherein the stop belt comprises a first anchor portion fixedly attached to the latch hold mechanism and a second anchor portion fixedly attached to the frame.

8. The table saw of claim 7, wherein the first anchor portion is positioned closer to the work piece support surface than the second anchor portion.

9. The table saw of claim 6, further comprising:
a carriage supported by the frame and supporting the swing arm, the carriage positionable at a plurality of heights with respect to the frame, wherein the retraction path is one of a plurality of retraction paths, each of the plurality of retraction paths associated with a respective one of the plurality of heights, and the stop belt is positioned to intersect each of the plurality of retraction paths.

10. A table saw comprising:
a work piece support surface;
a swing arm movable along a swing arm path from a first swing arm position whereat an arbor shaft rotatably supported by the swing arm is positioned proximate to the work piece support surface and a second swing arm position whereat the arbor shaft is distal to the work piece support surface;
a stop belt positioned across the swing arm path; and
a control system configured to cause the swing arm to move along the swing arm path in response to a sensed condition.

11. The table saw of claim 10, wherein the stop belt comprises a stretchable material.

12. The table saw of claim 11, wherein the stretchable material comprises a NYLON material.

13. The table saw of claim 10, further comprising:
a latch hold mechanism;
a latch pin movable between a first latch pin position whereat the swing arm is maintained at the first swing arm position and a second latch pin position whereat the swing arm is not maintained at the first swing arm position; and
an actuating device configured to generate a first force to bias the latch pin in a direction toward the second latch position, and, after transferring the first force, further configured to transfer a second force to the swing arm.

14. The table saw of claim 13, further comprising:
a frame supporting the swing arm, wherein the stop belt comprises a first anchor portion fixedly attached to the latch hold mechanism and a second anchor portion fixedly attached to the frame.

15. The table saw of claim 14, wherein the first anchor portion is positioned closer to the work piece support surface than the second anchor portion.

* * * * *